United States Patent
Liao et al.

(10) Patent No.: US 10,215,956 B2
(45) Date of Patent: Feb. 26, 2019

(54) IMAGING LENS SYSTEM, IMAGE CAPTURING DEVICE AND ELECTRONIC DEVICE

(71) Applicant: LARGAN PRECISION CO., LTD., Taichung (TW)

(72) Inventors: Lin-Yao Liao, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 15/830,333

(22) Filed: Dec. 4, 2017

(65) Prior Publication Data

US 2018/0088300 A1    Mar. 29, 2018

Related U.S. Application Data

(63) Continuation of application No. 14/828,141, filed on Aug. 17, 2015, now Pat. No. 9,864,165.

(30) Foreign Application Priority Data

Apr. 29, 2015   (TW) .............................. 104113652 A

(51) Int. Cl.
*G02B 9/60* (2006.01)
*G02B 13/18* (2006.01)
(Continued)

(52) U.S. Cl.
CPC ........... *G02B 9/60* (2013.01); *G02B 13/0045* (2013.01); *H04N 5/2254* (2013.01)

(58) Field of Classification Search
CPC . G02B 9/00; G02B 9/60; G02B 13/00; G02B 13/001; G02B 13/0015; G02B 13/002; G02B 13/0045
See application file for complete search history.

(56) References Cited

U.S. PATENT DOCUMENTS

| 3,864,027 A | 2/1975 | Harada |
| 4,790,638 A | 12/1988 | Iwasaki et al. |

(Continued)

FOREIGN PATENT DOCUMENTS

| JP | 1983-001117 | 1/1983 |
| JP | S63-063012 | 3/1988 |

(Continued)

*Primary Examiner* — Thong Nguyen
(74) *Attorney, Agent, or Firm* — Locke Lord LLP; Tim Tingkang Xia, Esq.

(57) ABSTRACT

An imaging lens system includes, in order from an object side to an image side: a first lens element with positive refractive power having an object-side surface being convex in a paraxial region thereof; a second lens element with negative refractive power; a third lens element with refractive power, wherein an object-side surface and an image-side surface thereof are aspheric; a fourth lens element with refractive power, wherein an object-side surface and an image-side surface thereof are aspheric; and a fifth lens element with negative refractive power having an object-side surface being concave in a paraxial region thereof and an image-side surface being convex in a paraxial region thereof, which are both aspheric. The imaging lens system is further provided with an aperture stop, and there is no lens element with refractive power disposed between the aperture stop and the first lens element.

27 Claims, 24 Drawing Sheets

(51) Int. Cl.
    *G02B 13/00*     (2006.01)
    *H04N 5/225*     (2006.01)

(56) References Cited

U.S. PATENT DOCUMENTS

| | | | |
|---|---|---|---|
| 5,134,522 A | 7/1992 | Ueda | |
| 8,000,031 B1* | 8/2011 | Tsai | G02B 13/0045 359/714 |
| 9,823,449 B1* | 11/2017 | Chung | G02B 3/0062 |
| 2005/0200978 A1 | 9/2005 | Tesar et al. | |
| 2012/0087020 A1* | 4/2012 | Tang | G02B 13/0045 359/714 |
| 2012/0224091 A1* | 9/2012 | Ohtsu | G02B 9/60 348/333.01 |
| 2013/0057966 A1* | 3/2013 | Tsai | G02B 13/0045 359/714 |
| 2014/0104480 A1 | 4/2014 | Jung et al. | |
| 2014/0204480 A1* | 7/2014 | Jo | G02B 13/0045 359/764 |
| 2014/0293452 A1 | 10/2014 | Kanda et al. | |
| 2014/0293453 A1 | 10/2014 | Ogino et al. | |
| 2015/0116569 A1 | 4/2015 | Mercado | |
| 2016/0241753 A1* | 8/2016 | Jhang | G02B 13/005 |
| 2016/0320589 A1* | 11/2016 | Liao | G02B 9/60 |

FOREIGN PATENT DOCUMENTS

| | | |
|---|---|---|
| JP | H05-303033 | 11/1993 |
| JP | 2001-166207 | 6/2001 |

\* cited by examiner

IMAGING LENS SYSTEM, IMAGE CAPTURING DEVICE AND ELECTRONIC DEVICE

RELATED APPLICATIONS

This application is a continuation application of U.S. application Ser. No. 14/828,141 filed on Aug. 17, 2015, now issued as U.S. Pat. No. 9,864,165, which claims priority to Taiwan Application Serial Number 104113652, filed Apr. 29, 2015, which is incorporated by reference herein in its entirety.

BACKGROUND

Technical Field

The present disclosure relates to an imaging lens system and an image capturing device, and more particularly, to an imaging lens system and an image capturing device applicable to electronic devices.

Description of Related Art

As personal electronic products have been becoming more and more compact, the internal components of the electronic products are also required to be smaller in size than before, resulting in an increasing demand for miniaturized optical systems. In addition to the demand of miniaturization, the reduction of the pixel size of sensors in the advanced semiconductor manufacturing technologies has enabled optical systems to evolve toward the field of higher megapixels. Meanwhile, the popularity of smart phones and tablet computers greatly boosts the need for miniaturized optical systems featuring high image quality.

A conventional telephoto optical system generally adopts a multi-element structure and comprises glass lens elements with spherical surfaces. Such a configuration not only results in a bulky lens assembly with low portability, but the high price of the product has deterred large numbers of consumers. Therefore, conventional optical systems can no longer meet consumers' needs for convenience and multiple photographing functions.

Therefore, a need exists in the art for an optical system that features a miniaturized design and high image quality.

SUMMARY

According to one aspect of the present disclosure, an imaging lens system includes, in order from an object side to an image side: a first lens element with positive refractive power having a convex object-side surface; a second lens element with negative refractive power; a third lens element with refractive power, wherein an object-side surface and an image-side surface thereof are aspheric; a fourth lens element with refractive power, wherein an object-side surface and an image-side surface thereof are aspheric; and a fifth lens element with negative refractive power having a concave object-side surface and a convex image-side surface, which are both aspheric; wherein the imaging lens system is further provided with an aperture stop, and there is no lens element with refractive power disposed between the aperture stop and the first lens element; wherein the imaging lens system has a total of five lens elements with refractive power and an air gap is arranged on an optical axis between every two adjacent lens elements with refractive power; wherein a focal length of the imaging lens system is f, a curvature radius of the object-side surface of the first lens element is R1, a curvature radius of the image-side surface of the fourth lens element is R8, an axial distance between the aperture stop and the image-side surface of the fifth lens element is SD, an axial distance between the object-side surface of the first lens element and the image-side surface of the fifth lens element is TD, an axial distance between the second lens element and the third lens element is T23, an axial distance between the fourth lens element and the fifth lens element is T45, an axial distance between the third lens element and the fourth lens element is T34, and the following conditions are satisfied:

$3.3 < f/R1;$ $-1.8 < f/R8 < 1.8;$ $0.7 < SD/TD < 1.0;$ and $0.5 < (T23+T45)/T34 < 6.0.$ According to another aspect of the present disclosure, an image capturing device includes the aforementioned imaging lens system and an image sensor disposed on an image surface of the imaging lens system.

According to another aspect of the present disclosure, an electronic device includes the aforementioned image capturing device.

According to another aspect of the present disclosure, an imaging lens system includes, in order from an object side to an image side: a first lens element with positive refractive power having a convex object-side surface; a second lens element with negative refractive power; a third lens element with refractive power, wherein an object-side surface and an image-side surface thereof are aspheric; a fourth lens element with refractive power, wherein an object-side surface and an image-side surface thereof are aspheric; and a fifth lens element with negative refractive power having a concave object-side surface and a convex image-side surface, which are both aspheric; wherein the imaging lens system is further provided with an aperture stop, and there is no lens element with refractive power disposed between the aperture stop and the first lens element; wherein the imaging lens system has a total of five lens elements with refractive power and an air gap is arranged on an optical axis between every two adjacent lens elements with refractive power; wherein a focal length of the imaging lens system is f, a curvature radius of the object-side surface of the first lens element is R1, a curvature radius of the image-side surface of the fourth lens element is R8, an axial distance between the aperture stop and the image-side surface of the fifth lens element is SD, an axial distance between the object-side surface of the first lens element and image-side surface of the fifth lens element is TD, a central thickness of the third lens element is CT3, an axial distance between the third lens element and the fourth lens element is T34, and the following conditions are satisfied:

$3.3 < f/R1;$ $-1.0 < f/R8 < 1.0;$ $0.7 < SD/TD < 1.0;$ and $0.2 < CT3/T34 < 2.2.$ The present disclosure provides a telephoto imaging lens system for miniaturized devices. In addition to a telephoto function, the imaging lens system has a compact optical design that not only increases the portability but also significantly reduces the manufacturing cost so that it has the potential to gain popularity and is applicable to a wide range of applications The first lens element has positive refractive power so that the convergent capability of the system is mainly contributed from the object side of the lens assembly, thereby the system's size can be effectively controlled to increase the portability. The second lens element has negative refractive power so as to correct the chromatic aberration of the system. When the fifth lens element is a negative lens element, the back focal length of the imaging lens system can be prevented from becoming too long so as to meet the requirement for miniaturization. Moreover, the fifth lens element has a concave object-side surface and a convex image-side surface so that it is favorable for moving the principal point toward the object side and for controlling the field of view to facilitate the telephoto function.

When f/R1 satisfies the above condition, the photographing range can be effectively restricted to enable certain local image patches to have a higher resolution.

When f/R8 satisfies the above condition, the curvature of the image-side surface of the fourth lens element can be effectively controlled, and the amount of stray light incident on the image surface can be reduced to improve the image quality of the optical system.

When (T23+T45)/T34 satisfies the above condition, the spatial arrangement of the system can be effectively controlled to attain a balance between easy assembly of the lens assembly and the configuration of shapes of lens surfaces.

When CT3/T34 satisfies the above condition, the thickness of the third lens element can be controlled to be within a reasonable range, and the distance between the third lens element and the fourth lens element can be adjusted to balance the configuration of the system.

DETAILED DESCRIPTION

Figure 1A:
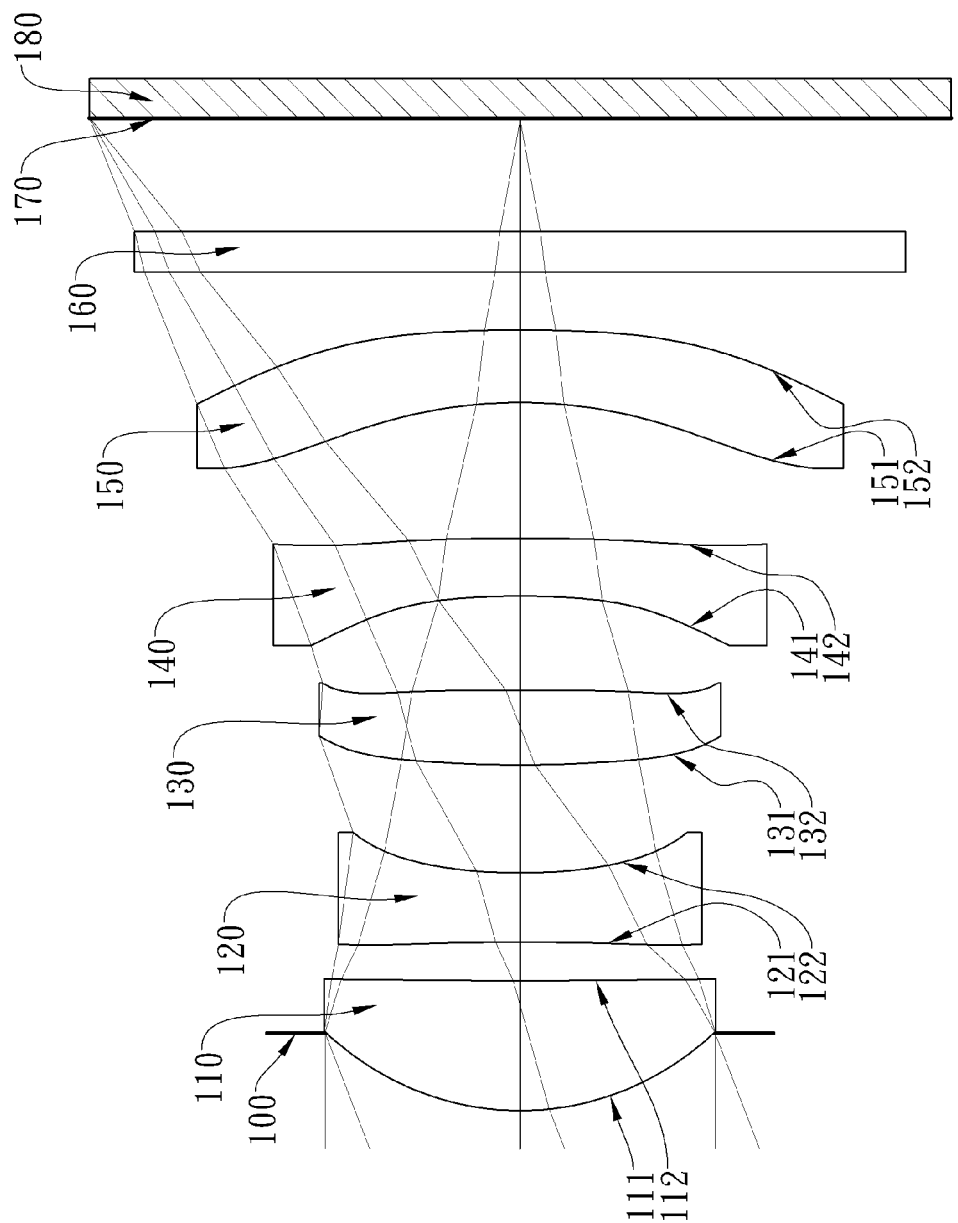
FIG. 1A is a schematic view of an image capturing device according to the 1st embodiment of the present disclosure.

The present disclosure provides an imaging lens system including, in order from an object side to an image side, a first lens element, a second lens element, a third lens element, a fourth lens element, and a fifth lens element, wherein the imaging lens system has a total of five lens elements with refractive power. The imaging lens system is further provided with an aperture stop, and no lens element with refractive power is disposed between the aperture stop and the first lens element.

The first lens element has positive refractive power so that the convergent capability of the system is mainly contributed from the object side of the lens assembly, thereby the system's size can be effectively controlled to increase the portability. The object-side surface of the first lens element is convex in a paraxial region thereof so that the distribution of the positive refractive power can be adjusted to enhance the miniaturization of the system.

The second lens element has negative refractive power so as to correct the chromatic aberration of the system. The image-side surface of the second lens element may be concave in a paraxial region thereof so as to favorably correct the aberration.

The third lens element may have positive refractive power, so that it is favorable for balancing the distribution of the refractive power of the system and thereby to reduce the sensitivity of the system. At least one of the object-side surface and the image-side surface of the third lens element may be provided with at least one inflection point so as to favorably correct the aberration of the off-axis field and to suppress the incident angle of the light projecting onto an image sensor from the off-axis field to increase the receiving efficiency of the image sensor.

The fourth lens element may have negative refractive power. The object-side surface of the fourth lens element may be concave in a paraxial region thereof and the image-side surface of the fourth lens element may be convex in a paraxial region thereof so as to favorably correct the astigmatism and thereby to improve the image quality.

The fifth lens element has negative refractive power so that the back focal length of the imaging lens system can be favorably reduced to keep the imaging lens system compact. The object-side surface of the fifth lens element may be concave in a paraxial region thereof and the image-side surface of the fifth lens element may be convex in a paraxial region thereof, so that it is favorable for moving the principal point toward the object side and for controlling the field of view to facilitate the telephoto function.

When a focal length of the imaging lens system is f, a curvature radius of the object-side surface of the first lens element is R1, and the following condition is satisfied: $3.3<f/R1$, the photographing range can be effectively restricted to enable certain local image patches to have a higher resolution.

When the focal length of the imaging lens system is f, a curvature radius of the image-side surface of the fourth lens element is R8, and the following condition is satisfied: $-1.8<f/R8<1.8$, the curvature of the image-side surface of the fourth lens element can be effectively controlled and the amount of stray light incident on the image surface can be reduced to improve the image quality of the imaging lens system. Preferably, the following condition is satisfied: $-1.4<f/R8<1.4$. More preferably, the following condition is satisfied: $-1.0<f/R8<1.0$.

When an axial distance between the aperture stop and the image-side surface of the fifth lens element is SD, an axial distance between the object-side surface of the first lens element and the image-side surface of the fifth lens element is TD, and the following condition is satisfied: $0.7<SD/TD<1.0$, the total track length of the system can be balanced while the light entry angle is controlled so as to prevent the system from being too bulky.

When an axial distance between the second lens element and the third lens element is T23, an axial distance between the fourth lens element and the fifth lens element is T45, an axial distance between the third lens element and the fourth lens element is T34, and the following condition is satisfied: $0.5<(T23+T45)/T34<6.0$, the spatial arrangement of the system can be effectively controlled to attain a balance between easy assembly of the lens assembly and the configuration of shapes of lens surfaces. Preferably, the following condition is satisfied: $2.3<(T23+T45)/T34<5.5$.

When a central thickness of the third lens element is CT3, the axial distance between the third lens element and the fourth lens element is T34, and the following condition is satisfied: $0.2<CT3/T34<2.2$, the thickness of the third lens element can be controlled to be within a reasonable range, and the distance between the third lens element and the fourth lens element can be adjusted to balance the configuration of the system. Preferably, the following condition is satisfied: $0.5<CT3/T34<1.9$.

When a focal length of the fourth lens element is f4, a focal length of the fifth lens element is f5, and the following condition is satisfied: $0<f4/f5$, it is favorable for reducing the sensitivity and spherical aberration of the system.

When a curvature radius of the object-side surface of the fifth lens element is R9, a curvature radius of the image-side surface of the fifth lens element is R10, and the following condition is satisfied: $-1.0<(R9-R10)/(R9+R10)<0$, it is favorable for correcting the astigmatism so as to maintain good image quality.

When the focal length of the imaging lens system is f, a maximum image height of the imaging lens system is ImgH (i.e. half of a diagonal length of an effective photosensitive area of the image sensor), and the following condition is satisfied: $2.1<f/ImgH<6.0$, it is favorable for keeping the system compact and obtaining good image quality.

Figure 11:
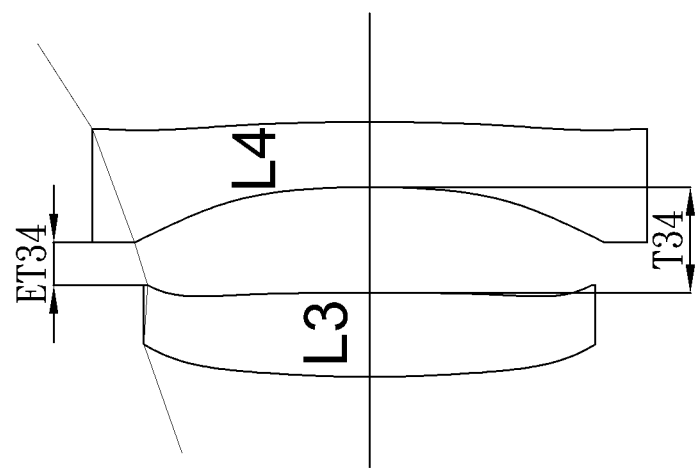
FIG. 11 shows a distance in parallel with the optical axis between a maximum effective radius position on the image-side surface of the third lens element and a maximum effective radius position on the object-side surface of the fourth lens element.

When the axial distance between the third lens element and the fourth lens element is T34, a distance in parallel with the optical axis between a maximum effective radius position on the image-side surface of the third lens element and a maximum effective radius position on the object-side surface of the fourth lens element is ET34, and the following condition is satisfied: $2.0<T34/ET34$, the arrangement of optical path lengths of different lights from the off-axis field and angles of such lights can be adjusted to correct the aberration of the off-axis field. Referring to FIG. 11, in the imaging lens system of the present disclosure, ET34 denotes the distance in parallel with the optical axis between the maximum effective radius position on the image-side surface of the third lens element (L3) and the maximum effective radius position on the object-side surface of the fourth lens element (L4), and the axial distance between the third lens element (L3) and the fourth lens element (L4) is T34.

When a maximum refractive index among the refractive indices of the first lens element, the second lens element, the third lens element, the fourth lens element, and the fifth lens elements is Nmax, and the following condition is satisfied: $1.50<Nmax<1.70$, it is favorable for arranging suitable materials for lens elements and for increasing the flexibility in design.

When an axial distance between the object-side surface of the first lens element and an image surface is TL, the focal length of the imaging lens system is f, and the following condition is satisfied: $0.75<TL/f<1.0$, the range of field of view can be effectively controlled while miniaturization is achieved, thereby meeting the requirement for multiple photographing functions.

When half of maximal field of view of the imaging lens system is HFOV, and the following condition is satisfied: $0.3<\tan(2*HFOV)<1.0$, it is favorable for capturing distant details and forming images thereof on the image surface, thereby achieving telephoto effects.

When the axial distance between the object-side surface of the first lens element and the image surface is TL, and the following condition is satisfied: $TL<7.5$ mm, the requirement for miniaturization can be met.

When an Abbe number of the second lens element is V2, an Abbe number of the third lens element is V3, an Abbe number of the first lens element is V1, and the following condition is satisfied: $0.5<(V2+V3)/V1<1.0$, the chromatic aberration in the system can be effectively corrected to improve the image quality.

When the curvature radius of the image-side surface of the fifth lens element is R10, the curvature radius of the image-side surface of the fourth lens element is R8, and the following condition is satisfied: $-0.2<R10/R8<0.9$, the amount of stray light in the system can be reduced, and the back focal length of the system can also be effectively controlled to meet the requirement for miniaturization.

When the maximum image height of the imaging lens system is ImgH, an entrance pupil diameter of the imaging lens system is EPD, and the following condition is satisfied: $0.7<EPD/ImgH<1.6$, a sufficient amount of incident light can be provided, and it is favorable for keeping the imaging lens system compact so that it can be equipped in a compact portable electronic product.

According to the imaging lens system of the present disclosure, the lens elements thereof can be made of glass or plastic material. When the lens elements are made of glass material, the distribution of the refractive power of the imaging lens system may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical surfaces so as to have more controllable variables for eliminating the aberration thereof and to further decrease the required number of the lens elements, the total track length of the imaging lens system can be effectively reduced.

According to the imaging lens system of the present disclosure, the imaging lens system can include at least one stop, such as an aperture stop, a glare stop or a field stop, so as to favorably reduce the amount of stray light and thereby to improve the image quality.

According to the imaging lens system of the present disclosure, a stop can be configured as a front stop or a middle stop. A front stop disposed between an imaged object and the first lens element can provide a longer distance between an exit pupil of the imaging lens system and the image surface, thereby the generated telecentric effect improves the image-sensing efficiency of an image sensor, such as a CCD or CMOS sensor. A middle stop disposed between the first lens element and the image surface is favorable for enlarging the field of view of the imaging lens system and thereby to provide a wider field of view for the same.

According to the imaging lens system of the present disclosure, when the lens element has a convex surface and the region of convex shape is not defined, it indicates that the surface is convex in the paraxial region thereof; when the lens element has a concave surface and the region of concave shape is not defined, it indicates that the surface is concave in the paraxial region thereof. Likewise, when the region of refractive power or focal length of a lens element is not defined, it indicates that the region of refractive power or focal length of the lens element is in the paraxial region thereof.

According to the imaging lens system of the present disclosure, an image surface of the imaging lens system, based on the corresponding image sensor, can be a plane or a curved surface with any curvature, especially a curved surface being concave facing towards the object side.

The imaging lens system of the present disclosure can be optionally applied to moving focus optical systems. According to the imaging lens system of the present disclosure, the imaging lens system features good correction capability and high image quality, and can be applied to 3D (three-dimensional) image capturing applications and electronic devices, such as digital cameras, mobile devices, digital tablets, smart TV, wireless monitoring device, motion sensing input device, driving recording system, rear view camera system, and wearable devices.

According to the present disclosure, an image capturing device includes the aforementioned imaging lens system and an image sensor, wherein the image sensor is disposed on or near an image surface of the imaging lens system. Therefore, the design of the imaging lens system enables the image capturing device to achieve the best image quality. Preferably, the imaging lens system can further include a barrel member, a holding member or a combination thereof.

Figure 12A:
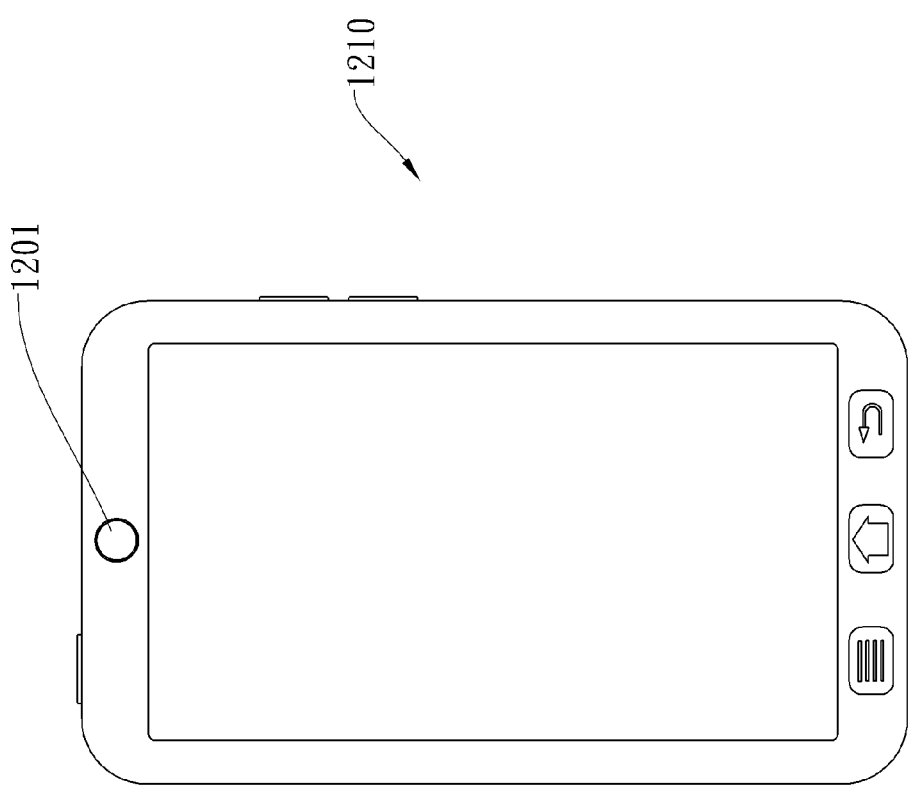
FIG. 12A shows a smart phone with an image capturing device of the present disclosure installed therein.
Figure 12B:
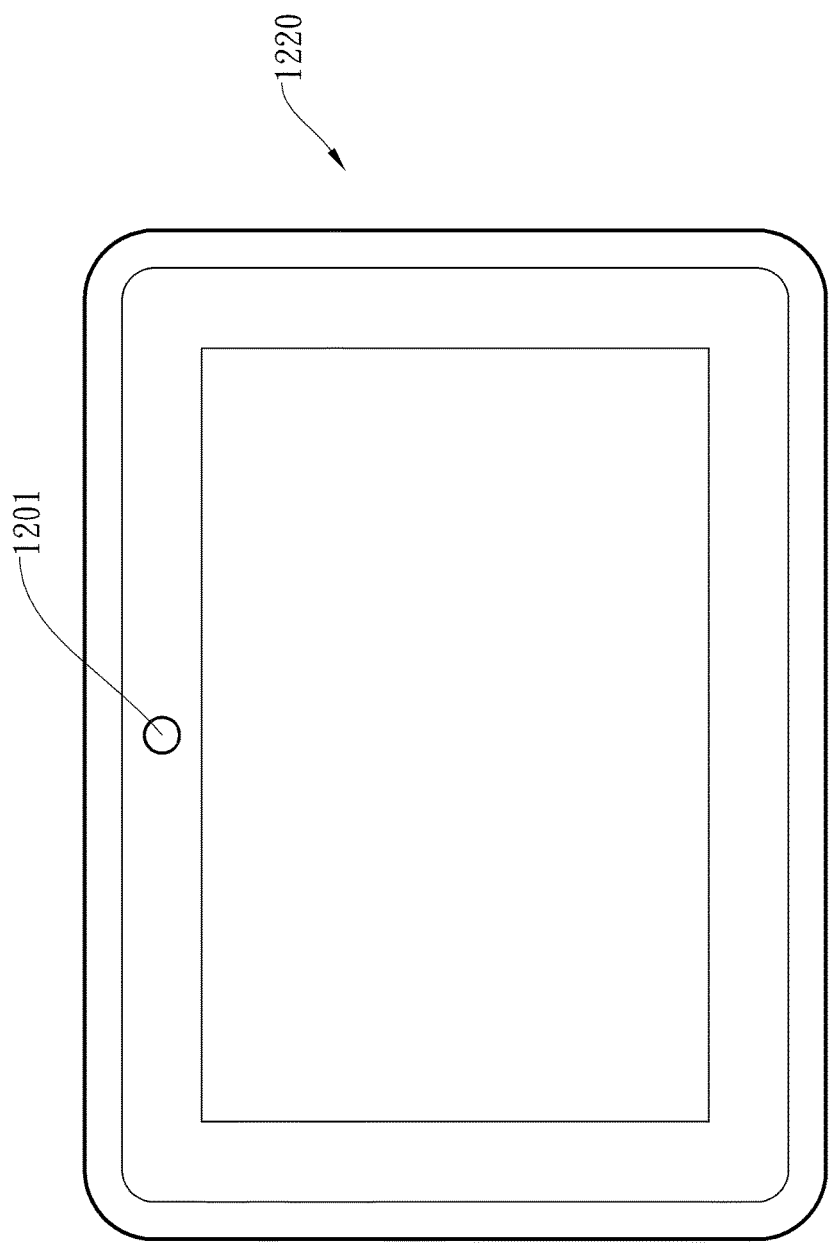
FIG. 12B shows a tablet personal computer with an image capturing device of the present disclosure installed therein.
Figure 12C:
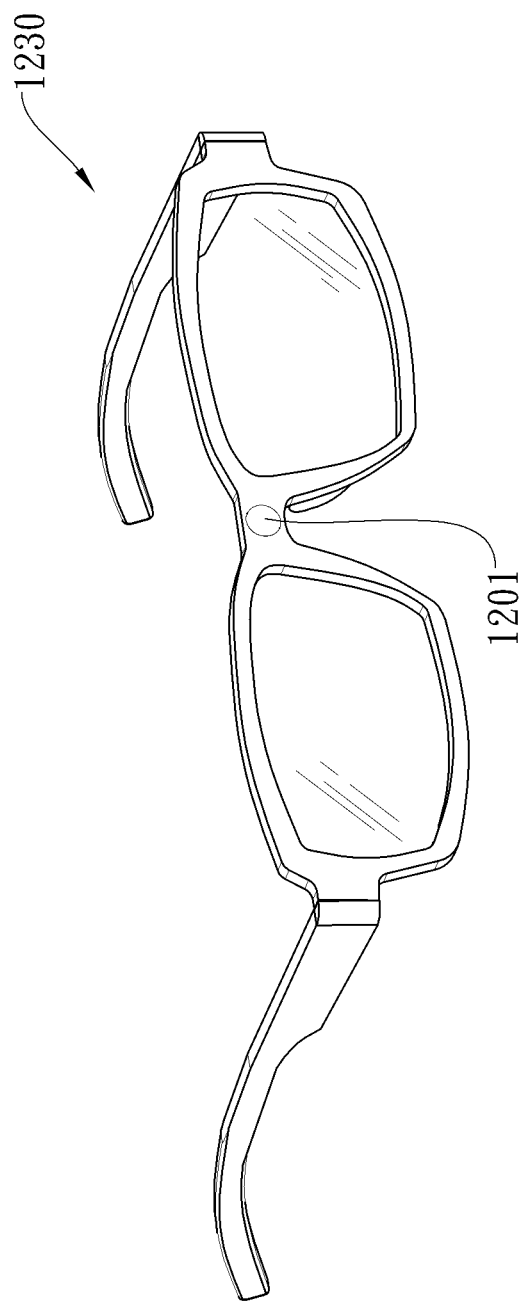
FIG. 12C shows a wearable device with an image capturing device of the present disclosure installed therein.

Referring to FIG. 12A, FIG. 12B and FIG. 12C, an image capturing device 1201 may be installed in an electronic device, including, but not limited to, a smart phone 1210, a tablet personal computer 1220 or a wearable device 1230. The three exemplary figures of different kinds of electronic devices are only exemplary for showing the image capturing device of the present disclosure installed in an electronic device and are not limited thereto. Preferably, the electronic device can further include a control unit, a display unit, a storage unit, a random access memory unit (RAM) or a combination thereof.

According to the above description of the present disclosure, the following 1st-10th specific embodiments are provided for further explanation.

1st Embodiment

Figure 1B:
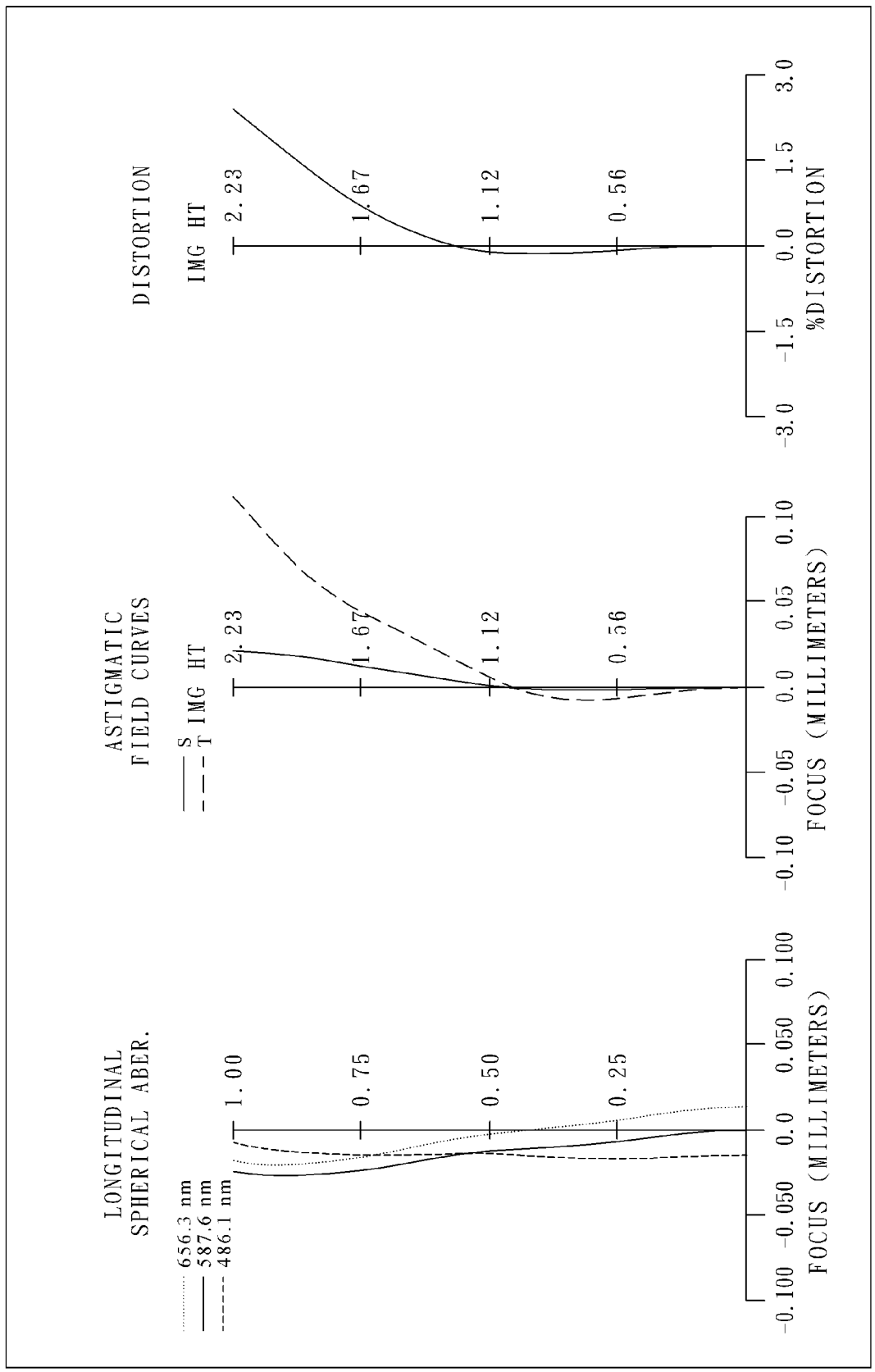
FIG. 1B shows longitudinal spherical aberration curves, astigmatic field curves and a distortion curve of the image capturing device according to the 1st embodiment.

FIG. 1A is a schematic view of an image capturing device according to the 1st embodiment of the present disclosure. FIG. 1B shows, in order from left to right, longitudinal spherical aberration curves, astigmatic field curves and a distortion curve of the image capturing device according to the 1st embodiment.

In FIG. 1A, the image capturing device includes an imaging lens system (not otherwise herein labeled) of the present disclosure and an image sensor 180. The imaging lens system includes, in order from an object side to an image side, a first lens element 110, a second lens element 120, a third lens element 130, a fourth lens element 140, and a fifth lens element 150, wherein the imaging lens system has a total of five lens elements (110-150) with refractive power.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with negative refractive power has an object-side surface 121 being concave in a paraxial region thereof and an image-side surface 122 being concave in a paraxial region thereof, which are both aspheric, and the second lens element 120 is made of plastic material.

The third lens element 130 with positive refractive power has an object-side surface 131 being convex in a paraxial region thereof and an image-side surface 132 being concave in a paraxial region thereof, which are both aspheric, and the third lens element 130 is made of plastic material. Furthermore, the image-side surface 132 of the third lens element 130 has at least one inflection point.

The fourth lens element 140 with negative refractive power has an object-side surface 141 being concave in a paraxial region thereof and an image-side surface 142 being convex in a paraxial region thereof, which are both aspheric, and the fourth lens element 140 is made of plastic material.

The fifth lens element 150 with negative refractive power has an object-side surface 151 being concave in a paraxial region thereof and an image-side surface 152 being convex in a paraxial region thereof, which are both aspheric, and the fifth lens element 150 is made of plastic material.

The imaging lens system is further provided with an aperture stop 100 disposed between an imaged object and the first lens element 110, and no lens element with refractive power is disposed between the aperture stop 100 and the first lens element 110. The imaging lens system further includes an IR-cut filter 160 located between the fifth lens element 150 and an image surface 170. The IR-cut filter 160 is made of glass and will not affect the focal length of the imaging lens system. The image sensor 180 is disposed on or near the image surface 170 of the imaging lens system.

The equation of the aspheric surface profiles is expressed as follows:

$$X(Y) = (Y^2/R)/(1 + sqrt(1 - (1+k)*(Y/R)^2)) + \sum_i (Ai)*(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the first embodiment, a focal length of the imaging lens system is f, an f-number of the imaging 1 lens system is Fno, half of maximal field of view of the imaging lens system is HFOV, a maximum refractive index among the refractive indices of the first lens element 110, the second lens element 120, the third lens element 130, the fourth lens element 140 and the fifth lens element 150 is Nmax, and these parameters have the following values: f=5.70 mm; Fno=2.82; HFOV=21.0 degrees; tan(2*HFOV)=0.900; and Nmax=1.650.

In the first embodiment, an Abbe number of the first lens element 110 is V1, an Abbe number of the second lens element 120 is V2, an Abbe number of the third lens element 130 is V3, and they satisfy the condition: (V2+V3)/V1=0.77.

In the first embodiment, a central thickness of the third lens element 130 is CT3, an axial distance between the third lens element 130 and the fourth lens element 140 is T34, and they satisfy the condition: CT3/T34=0.79.

In the first embodiment, the axial distance between the third lens element 130 and the fourth lens element 140 is T34, a distance in parallel with the optical axis between a maximum effective radius position on the image-side surface 132 of the third lens element 130 and a maximum effective radius position on the object-side surface 141 of the fourth lens element 140 is ET34, and they satisfy the condition: T34/ET34=2.49.

In the first embodiment, an axial distance between the second lens element 120 and the third lens element 130 is T23, an axial distance between the fourth lens element 140 and the fifth lens element 150 is T45, the axial distance between the third lens element 130 and the fourth lens element 140 is T34, and they satisfy the condition: (T23+T45)/T34=2.58.

In the first embodiment, the focal length of the imaging lens system is f, a curvature radius of the object-side surface 111 of the first lens element 110 is R1, and they satisfy the condition: f/R1=4.01.

In the first embodiment, the focal length of the imaging lens system is f, a curvature radius of the image-side surface 142 of the fourth lens element 140 is R8, and they satisfy the condition: f/R8=−0.42.

In the first embodiment, a curvature radius of the image-side surface 152 of the fifth lens element 150 is R10, the curvature radius of the image-side surface 142 of the fourth lens element 140 is R8, and they satisfy the condition: R10/R8=0.77.

In the first embodiment, a curvature radius of the object-side surface 151 of the fifth lens element 150 is R9, the curvature radius of the image-side surface 152 of the fifth lens element 150 is R10, and they satisfy the condition: (R9−R10)/(R9+R10)=−0.60.

In the first embodiment, a focal length of the fourth lens element 140 is f4, a focal length of the fifth lens element 150 is f5, and they satisfy the condition: f4/f5=2.23.

In the first embodiment, an axial distance between the aperture stop 100 and the image-side surface 152 of the fifth lens element 150 is SD, an axial distance between the object-side surface 111 of the first lens element 110 and the image-side surface 152 of the fifth lens element 150 is TD, and they satisfy the condition: SD/TD=0.90.

In the first embodiment, the focal length of the imaging lens system is f, a maximum image height of the imaging lens system is ImgH, and they satisfy the condition: f/ImgH=2.56.

In the first embodiment, an entrance pupil diameter of the imaging lens system is EPD, the maximum image height of the imaging lens system is ImgH, and they satisfy the condition: EPD/ImgH=0.91.

In the first embodiment, an axial distance between the object-side surface 111 of the first lens element 110 and the image surface 170 is TL, the focal length of the imaging lens system is f, and they satisfy the condition: TL/f=0.90.

In the first embodiment, the axial distance between the object-side surface 111 of the first lens element 110 and the image surface 170 is TL, and it has the following value: TL=5.15 mm.

The detailed optical data of the first embodiment are shown in TABLE 1, and the aspheric surface data are shown in TABLE 2, wherein the units of the curvature radius, the thickness and the focal length are expressed in mm, and HFOV is half of the maximal field of view.

TABLE 1

(Embodiment 1)
f = 5.70 mm, Fno = 2.82, HFOV = 21.0 deg.

| Surface # | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.402 | | | | |
| 2 | Lens 1 | 1.421 | ASP | 0.673 | Plastic | 1.544 | 55.9 | 2.83 |
| 3 | | 15.382 | ASP | 0.200 | | | | |
| 4 | Lens 2 | −56.204 | ASP | 0.360 | Plastic | 1.650 | 21.4 | −3.86 |
| 5 | | 2.634 | ASP | 0.560 | | | | |
| 6 | Lens 3 | 5.479 | ASP | 0.387 | Plastic | 1.650 | 21.4 | 8.64 |

TABLE 1-continued (Embodiment 1)
f = 5.70 mm, Fno = 2.82, HFOV = 21.0 deg.

| Surface # | | Curvature Radius | | Thickness | Material | Index | Abbe# | Focal Length |
|---|---|---|---|---|---|---|---|---|
| 7 | | 226.723 | ASP | 0.489 | | | | |
| 8 | Lens 4 | −4.855 | ASP | 0.300 | Plastic | 1.535 | 55.7 | −14.39 |
| 9 | | −13.426 | ASP | 0.704 | | | | |
| 10 | Lens 5 | −2.552 | ASP | 0.376 | Plastic | 1.535 | 55.7 | −6.44 |
| 11 | | −10.336 | ASP | 0.300 | | | | |
| 12 | IR-cut filter | Plano | | 0.210 | Glass | 1.517 | 64.2 | — |
| 13 | | Plano | | 0.589 | | | | |
| 14 | Image Surface | Plano | | — | | | | |

Note:
Reference Wavelength is d-line 587.6 nm

TABLE 2

Aspheric Coefficients

| Surface # | 2 | 3 | 4 | 5 | 6 |
|---|---|---|---|---|---|
| k = | −3.5439E+00 | −1.5364E+01 | −9.0000E+01 | 5.3973E+00 | −4.4140E+01 |
| A4 = | 1.4375E−01 | −1.1400E−01 | −1.6725E−01 | −8.6043E−02 | −3.6838E−02 |
| A6 = | −6.0563E−02 | 2.7274E−01 | 5.2020E−01 | 3.1738E−01 | 1.8101E−02 |
| A8 = | 7.6480E−02 | −4.2547E−01 | −8.4969E−01 | −3.0109E−01 | 1.6749E−01 |
| A10 = | −7.3668E−02 | 4.2317E−01 | 9.4347E−01 | 2.5742E−01 | −1.1186E−01 |
| A12 = | 4.0333E−02 | −2.2949E−01 | −6.0549E−01 | −1.3847E−01 | 1.9407E−02 |
| A14 = | −7.9060E−03 | 5.0980E−02 | 1.5907E−01 | 6.1861E−03 | |

| Surface # | 7 | 8 | 9 | 10 | 11 |
|---|---|---|---|---|---|
| k = | −9.0000E+01 | 8.3290E+00 | 8.2748E+01 | 9.3541E−01 | 1.2006E+01 |
| A4 = | −1.0293E−01 | −1.0880E−01 | 1.6490E−02 | −1.0835E−02 | −7.8244E−02 |
| A6 = | 3.9109E−02 | −1.6852E−01 | −1.2161E−01 | 3.2065E−02 | 3.4103E−02 |
| A8 = | 8.8015E−02 | 2.6037E−01 | 2.0451E−01 | −1.2601E−02 | −1.1536E−02 |
| A10 = | 1.7266E−02 | −3.9952E−02 | −1.2256E−01 | 9.7840E−03 | 3.0066E−03 |
| A12 = | −1.8915E−02 | −6.7074E−02 | 3.1877E−02 | −3.5677E−03 | −4.6566E−04 |
| A14 = | | 2.4964E−02 | −3.2024E−03 | 4.5561E−04 | 3.5349E−05 |

2nd Embodiment

Figure 2A:
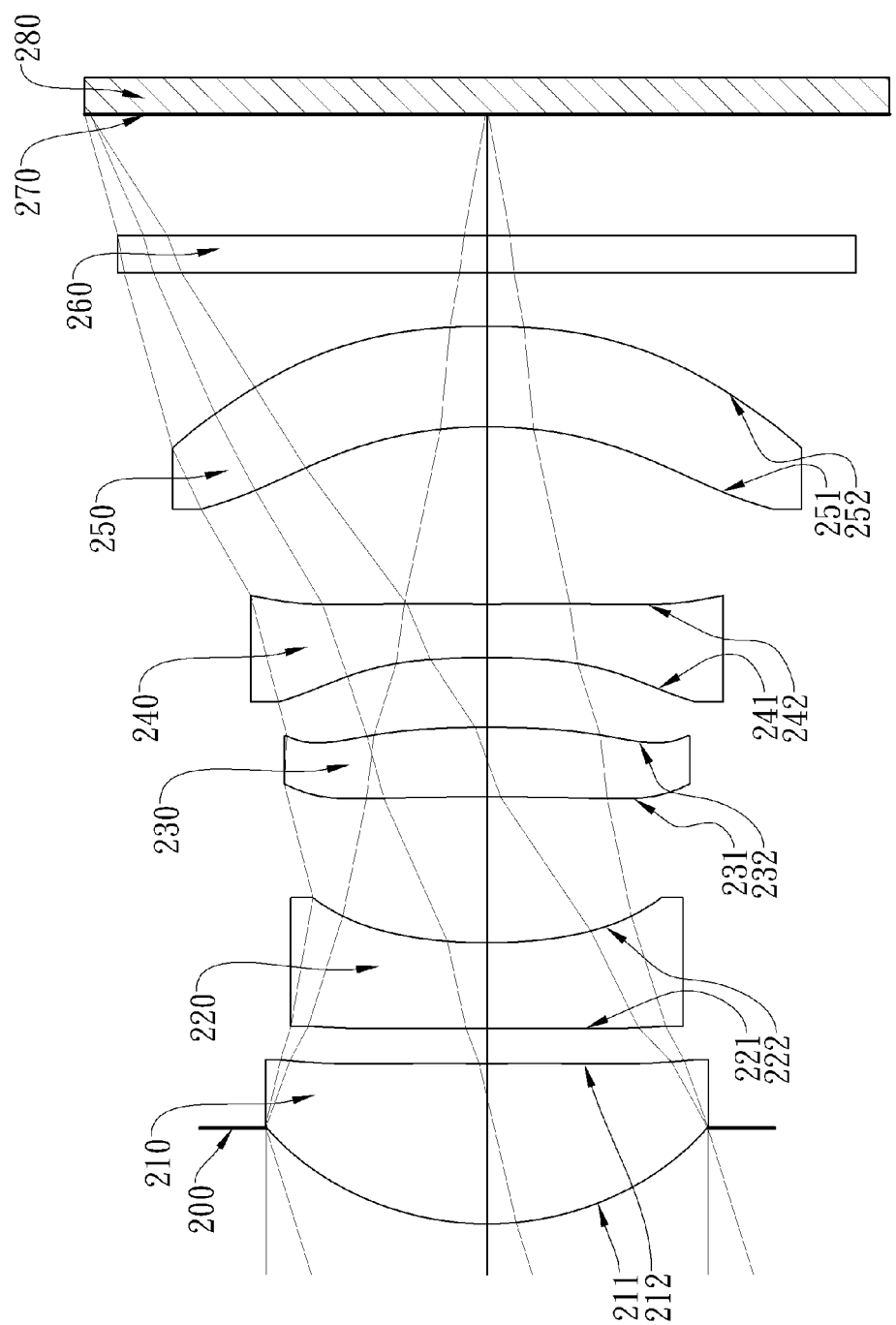
FIG. 2A is a schematic view of an image capturing device according to the 2nd embodiment of the present disclosure.
Figure 2B:
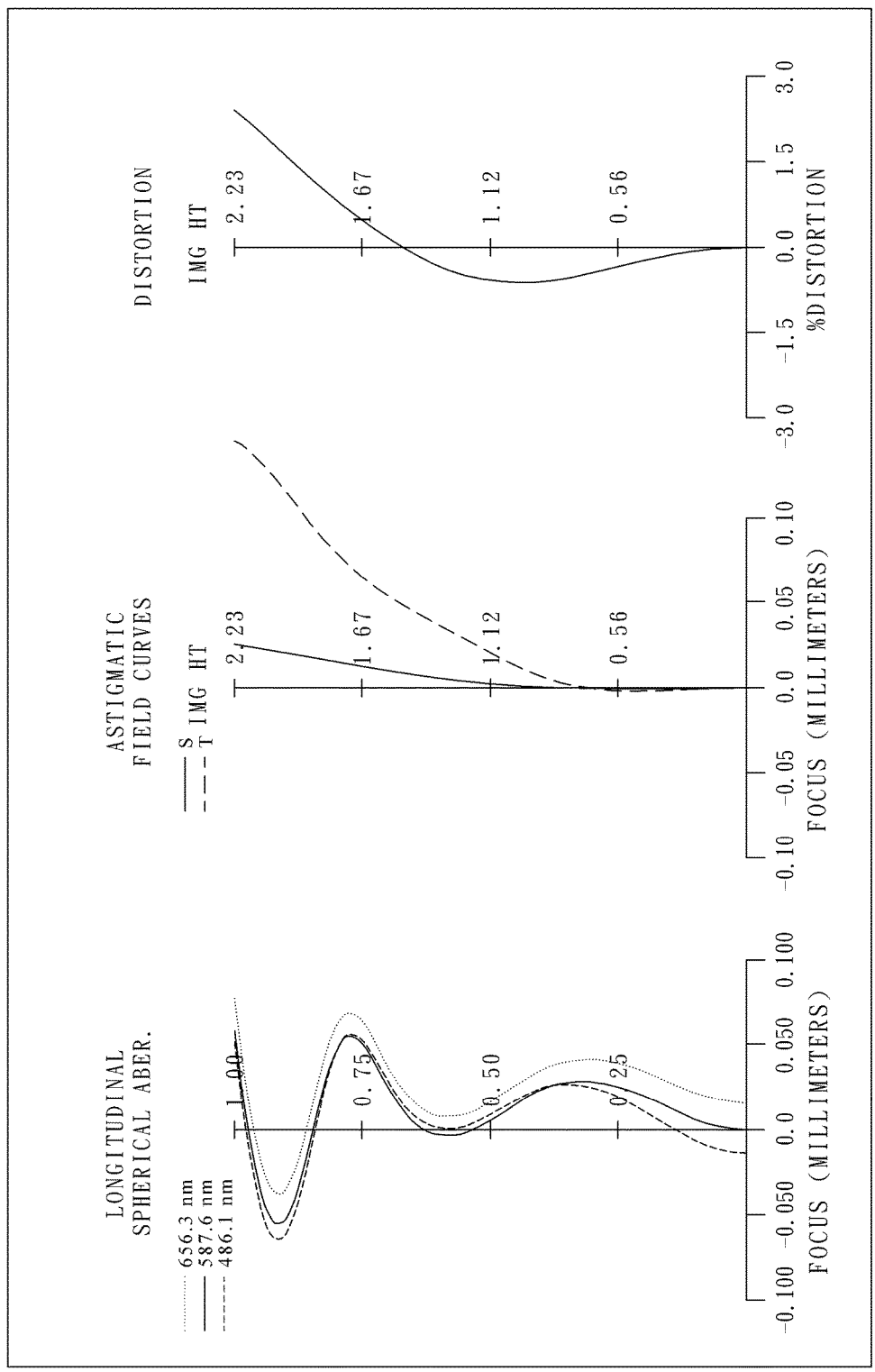
FIG. 2B shows longitudinal spherical aberration curves, astigmatic field curves and a distortion curve of the image capturing device according to the 2nd embodiment.

FIG. 2A is a schematic view of an image capturing device according to the 2nd embodiment of the present disclosure. FIG. 2B shows, in order from left to right, longitudinal spherical aberration curves, astigmatic field curves and a distortion curve of the image capturing device according to the 2nd embodiment.

In FIG. 2A, the image capturing device includes an imaging lens system (not otherwise herein labeled) of the present disclosure and an image sensor 280. The imaging lens system includes, in order from an object side to an image side, a first lens element 210, a second lens element 220, a third lens element 230, a fourth lens element 240, and a fifth lens element 250, wherein the imaging lens system has a total of five lens elements (210-250) with refractive power.

The first lens element 210 with positive refractive power has an object-side surface 211 being convex in a paraxial region thereof and an image-side surface 212 being concave in a paraxial region thereof, which are both aspheric, and the first lens element 210 is made of plastic material.

The second lens element 220 with negative refractive power has an object-side surface 221 being convex in a paraxial region thereof and an image-side surface 222 being concave in a paraxial region thereof, which are both aspheric, and the second lens element 220 is made of plastic material.

The third lens element 230 with positive refractive power has an object-side surface 231 being concave in a paraxial region thereof and an image-side surface 232 being convex in a paraxial region thereof, which are both aspheric, and the third lens element 230 is made of plastic material. Furthermore, each of the object-side surface 231 and the image-side surface 232 of the third lens element 230 has at least one inflection point.

The fourth lens element 240 with negative refractive power has an object-side surface 241 being concave in a paraxial region thereof and an image-side surface 242 being concave in a paraxial region thereof, which are both aspheric, and the fourth lens element 240 is made of plastic material.

The fifth lens element 250 with negative refractive power has an object-side surface 251 being concave in a paraxial region thereof and an image-side surface 252 being convex in a paraxial region thereof, which are both aspheric, and the fifth lens element 250 is made of plastic material.

The imaging lens system is further provided with an aperture stop 200 disposed between an imaged object and the first lens element 210, and no lens element with refractive power is disposed between the aperture stop 200 and the first lens element 210. The imaging lens system further includes an IR-cut filter 260 located between the fifth lens element 250 and an image surface 270. The IR-cut filter 260 is made of glass and will not affect the focal length of the imaging lens system. The image sensor 280 is disposed on or near the image surface 270 of the imaging lens system.

The detailed optical data of the second embodiment are shown in TABLE 3, and the aspheric surface data are shown in TABLE 4, wherein the units of the curvature radius, the thickness and the focal length are expressed in mm, and HFOV is half of the maximal field of view.

TABLE 3

(Embodiment 2)
f = 7.01 mm, Fno = 2.82, HFOV = 17.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.539 | | | | |
| 2 | Lens 1 | 1.686 | ASP | 0.902 | Plastic | 1.544 | 55.9 | 3.23 |
| 3 | | 33.669 | ASP | 0.200 | | | | |
| 4 | Lens 2 | 25.778 | ASP | 0.480 | Plastic | 1.650 | 21.4 | −4.50 |
| 5 | | 2.604 | ASP | 0.820 | | | | |
| 6 | Lens 3 | −150.369 | ASP | 0.393 | Plastic | 1.650 | 21.4 | 11.42 |
| 7 | | −7.076 | ASP | 0.393 | | | | |
| 8 | Lens 4 | −5.194 | ASP | 0.300 | Plastic | 1.535 | 55.7 | −9.09 |
| 9 | | 77.399 | ASP | 0.999 | | | | |
| 10 | Lens 5 | −2.513 | ASP | 0.566 | Plastic | 1.535 | 55.7 | −16.14 |
| 11 | | −3.823 | ASP | 0.300 | | | | |
| 12 | IR-cut filter | Plano | | 0.210 | Glass | 1.517 | 64.2 | — |
| 13 | | Plano | | 0.683 | | | | |
| 14 | Image Surface | Plano | | — | | | | |

Note:
Reference wavelength is d-line 587.6 nm

TABLE 4

Aspheric Coefficients

| Surface # | 2 | 3 | 4 | 5 | 6 |
|---|---|---|---|---|---|
| k = | −5.2429E+00 | −3.5690E+01 | −9.0000E+01 | 5.2455E+00 | −9.0000E+01 |
| A4 = | 1.2327E−01 | −1.1840E−01 | −1.7225E−01 | −9.8150E−02 | −6.1368E−02 |
| A6 = | −6.7246E−02 | 2.9326E−01 | 5.1492E−01 | 2.7713E−01 | 5.6028E−03 |
| A8 = | 7.7497E−02 | −4.2076E−01 | −8.4676E−01 | −3.1811E−01 | 1.6829E−01 |
| A10 = | −7.2101E−02 | 4.2140E−01 | 9.4727E−01 | 2.4628E−01 | −1.0807E−01 |
| A12 = | 4.0658E−02 | −2.3188E−01 | −6.0545E−01 | −1.4301E−01 | 1.8915E−02 |
| A14 = | −8.8108E−03 | 4.9883E−02 | 1.5449E−01 | 9.0578E−03 | |

| Surface # | 7 | 8 | 9 | 10 | 11 |
|---|---|---|---|---|---|
| k = | −3.0961E+01 | 6.4184E+00 | −9.0000E+01 | 9.2207E−01 | 1.4504E+00 |
| A4 = | −1.1799E−01 | −9.9168E−02 | 3.7169E−03 | −3.3735E−02 | −7.1562E−02 |
| A6 = | 1.6919E−02 | −1.6075E−01 | −1.1982E−01 | 3.4833E−02 | 3.2972E−02 |
| A8 = | 8.2853E−02 | 2.5737E−01 | 2.0491E−01 | −1.2486E−02 | −1.0747E−02 |
| A10 = | 1.5261E−02 | −4.2337E−02 | −1.2241E−01 | 9.8254E−03 | 3.0557E−03 |
| A12 = | −1.9074E−02 | −6.6913E−02 | 3.1909E−02 | −3.5615E−03 | −4.9292E−04 |
| A14 = | | 2.6262E−02 | −3.2030E−03 | 4.5380E−04 | 2.2307E−05 |

In the 2nd embodiment, the equation of the aspheric surface profiles of the aforementioned lens elements is the same as the equation of the 1st embodiment. Also, the definitions of these parameters shown in Table 5 below are the same as those stated in the 1st embodiment with corresponding values for the 2nd embodiment, so an explanation in this regard will not be provided again.

Moreover, these parameters can be calculated from Table 3 and Table 4 and satisfy the conditions stated in Table 5.

TABLE 5

| 2$^{nd}$ Embodiment | | | |
|---|---|---|---|
| f [mm] | 7.01 | f/R8 | 0.09 |
| Fno | 2.82 | R10/R8 | −0.05 |
| HFOV [deg.] | 17.2 | (R9 − R10)/(R9 + R10) | −0.21 |
| tan(2*HFOV) | 0.685 | f4/f5 | 0.56 |
| Nmax | 1.650 | SD/TD | 0.89 |
| (V2 + V3)/V1 | 0.77 | f/ImgH | 3.14 |

TABLE 5-continued

| 2$^{nd}$ Embodiment | | | |
|---|---|---|---|
| CT3/T34 | 1.00 | EPD/ImgH | 1.11 |
| T34/ET34 | 2.05 | TL/f | 0.89 |
| (T23 + T45)/T34 | 4.63 | TL [mm] | 6.25 |
| f/R1 | 4.16 | | |

3rd Embodiment

Figure 3A:
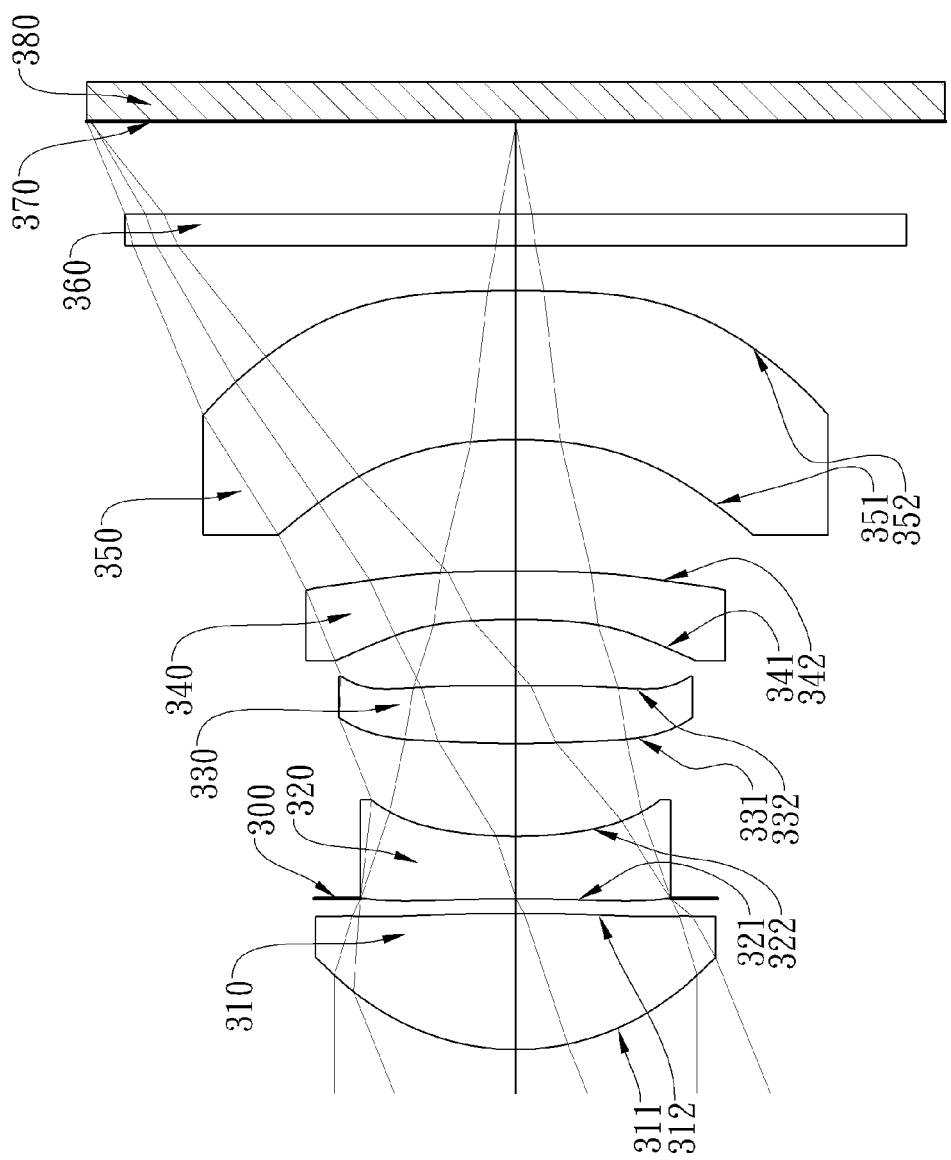
FIG. 3A is a schematic view of an image capturing device according to the 3rd embodiment of the present disclosure.
Figure 3B:
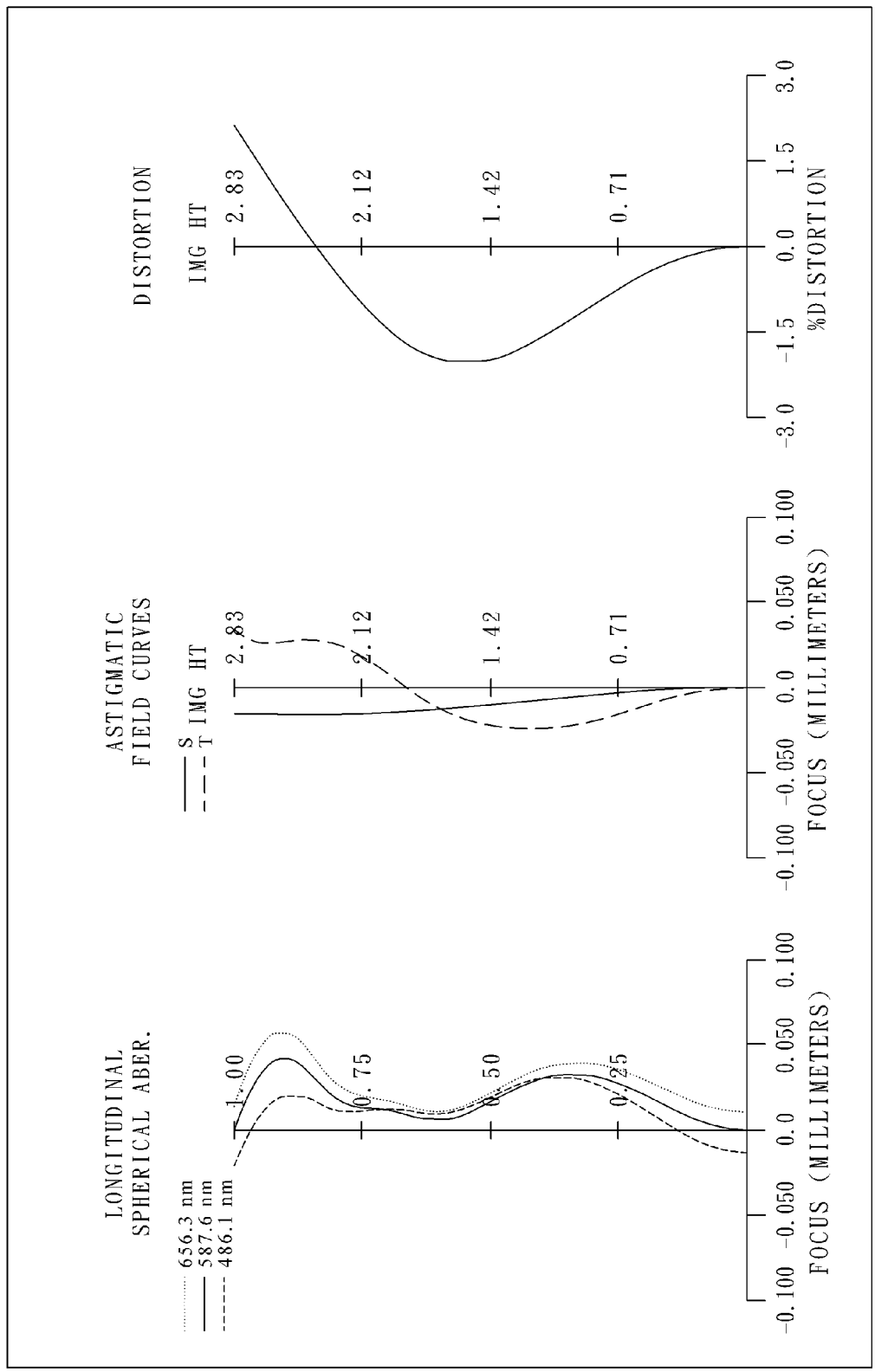
FIG. 3B shows longitudinal spherical aberration curves, astigmatic field curves and a distortion curve of the image capturing device according to the 3rd embodiment.

FIG. 3A is a schematic view of an image capturing device according to the 3rd embodiment of the present disclosure. FIG. 3B shows, in order from left to right, longitudinal spherical aberration curves, astigmatic field curves and a distortion curve of the image capturing device according to the 3rd embodiment.

In FIG. 3A, the image capturing device includes an imaging lens system (not otherwise herein labeled) of the present disclosure and an image sensor 380. The imaging lens system includes, in order from an object side to an image side, a first lens element 310, a second lens element 320, a third lens element 330, a fourth lens element 340, and a fifth lens element 350, wherein the imaging lens system has a total of five lens elements (310-350) with refractive power.

The first lens element 310 with positive refractive power has an object-side surface 311 being convex in a paraxial region thereof and an image-side surface 312 being convex in a paraxial region thereof, which are both aspheric, and the first lens element 310 is made of plastic material.

The second lens element 320 with negative refractive power has an object-side surface 321 being concave in a paraxial region thereof and an image-side surface 322 being concave in a paraxial region thereof, which are both aspheric, and the second lens element 320 is made of plastic material.

The third lens element 330 with positive refractive power has an object-side surface 331 being convex in a paraxial region thereof and an image-side surface 332 being concave in a paraxial region thereof, which are both aspheric, and the third lens element 330 is made of plastic material. Furthermore, the image-side surface 332 of the third lens element 330 has at least one inflection point.

The fourth lens element 340 with negative refractive power has an object-side surface 341 being concave in a paraxial region thereof and an image-side surface 342 being convex in a paraxial region thereof, which are both aspheric, and the fourth lens element 340 is made of plastic material.

The fifth lens element 350 with negative refractive power has an object-side surface 351 being concave in a paraxial region thereof and an image-side surface 352 being convex in a paraxial region thereof, which are both aspheric, and the fifth lens element 350 is made of plastic material.

The imaging lens system is further provided with an aperture stop 300 disposed between the first lens element 310 and the second lens element 320, and no lens element with refractive power is disposed between the aperture stop 300 and the first lens element 310. The imaging lens system further includes an IR-cut filter 360 located between the fifth lens element 350 and an image surface 370. The IR-cut filter 360 is made of glass and will not affect the focal length of the imaging lens system. The image sensor 380 is disposed on or near the image surface 370 of the imaging lens system.

The detailed optical data of the third embodiment are shown in TABLE 6, and the aspheric surface data are shown in TABLE 7, wherein the units of the curvature radius, the thickness and the focal length are expressed in mm, and HFOV is half of the maximal field of view.

TABLE 6

(Embodiment 3)
f = 6.83 mm, Fno = 2.82, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.666 | ASP | 0.907 | Plastic | 1.544 | 55.9 | 2.96 |
| 2 | | −39.891 | ASP | 0.100 | | | | |
| 3 | Ape. Stop | Plano | | −0.003 | | | | |
| 4 | Lens 2 | −53.624 | ASP | 0.419 | Plastic | 1.639 | 23.5 | −4.02 |
| 5 | | 2.706 | ASP | 0.620 | | | | |
| 6 | Lens 3 | 6.620 | ASP | 0.385 | Plastic | 1.639 | 23.5 | 12.41 |
| 7 | | 39.183 | ASP | 0.443 | | | | |
| 8 | Lens 4 | −6.274 | ASP | 0.322 | Plastic | 1.544 | 55.9 | −15.80 |
| 9 | | −23.638 | ASP | 0.880 | | | | |
| 10 | Lens 5 | −3.072 | ASP | 0.993 | Plastic | 1.535 | 55.7 | −7.19 |
| 11 | | −17.008 | ASP | 0.300 | | | | |
| 12 | IR-cut filter | Plano | | 0.210 | Glass | 1.517 | 64.2 | — |
| 13 | | Plano | | 0.622 | | | | |
| 14 | Image Surface | Plano | | — | | | | |

Note:
Reference wavelength is d-line 587.6 nm

TABLE 7

Aspheric Coefficients

| Surface # | 1 | 2 | 4 | 5 | 6 |
|---|---|---|---|---|---|
| k = | −4.9409E+00 | 9.0000E+01 | −9.0000E+01 | 5.6216E+00 | −9.5323E+00 |
| A4 = | 1.2613E−01 | −1.1935E−01 | −1.6818E−01 | −9.2844E−02 | −7.2783E−02 |
| A6 = | −7.0846E−02 | 2.9595E−01 | 5.2275E−01 | 2.6593E−01 | 1.8173E−03 |
| A8 = | 7.6069E−02 | −4.2127E−01 | −8.4007E−01 | −3.2143E−01 | 1.7073E−01 |
| A10 = | −7.2492E−02 | 4.2057E−01 | 9.4920E−01 | 2.8766E−01 | −1.0773E−01 |
| A12 = | 4.0424E−02 | −2.3221E−01 | −6.0538E−01 | −1.2890E−01 | 1.8381E−02 |
| A14 = | −9.0161E−03 | 4.9965E−02 | 1.5469E−01 | −1.6472E−02 | |

TABLE 7-continued

| | Aspheric Coefficients | | | | |
|---|---|---|---|---|---|
| Surface # | 7 | 8 | 9 | 10 | 11 |
| k = | −6.5512E+01 | 1.5038E+01 | 3.8511E+01 | 1.4128E+00 | 5.7218E+01 |
| A4 = | −1.1246E−01 | −9.8141E−02 | −3.1008E−02 | −6.2818E−02 | −8.2969E−02 |
| A6 = | 1.8395E−02 | −1.7138E−01 | −1.2248E−01 | 2.0714E−02 | 2.6804E−02 |
| A8 = | 8.1164E−02 | 2.5567E−01 | 2.0483E−01 | −1.2015E−02 | −9.7695E−03 |
| A10 = | 1.3559E−02 | −4.0690E−02 | −1.2192E−01 | 1.0757E−02 | 2.9969E−03 |
| A12 = | −2.0640E−02 | −6.6785E−02 | 3.2118E−02 | −3.5659E−03 | −5.1384E−04 |
| A14 = | | 2.5663E−02 | −3.2369E−03 | 3.8077E−04 | 3.5057E−05 |

In the 3rd embodiment, the equation of the aspheric surface profiles of the aforementioned lens elements is the same as the equation of the 1st embodiment. Also, the definitions of these parameters shown in Table 8 below are the same as those stated in the 1st embodiment with corresponding values for the 3rd embodiment, so an explanation in this regard will not be provided again.

Moreover, these parameters can be calculated from Table 6 and Table 7 and satisfy the conditions stated in Table 8.

TABLE 8

| 3$^{rd}$ Embodiment | | | |
|---|---|---|---|
| f [mm] | 6.83 | f/R8 | −0.29 |
| Fno | 2.82 | R10/R8 | 0.72 |
| HFOV [deg.] | 22.0 | (R9 − R10)/(R9 + R10) | −0.69 |
| tan(2*HFOV) | 0.966 | f4/f5 | 2.20 |
| Nmax | 1.639 | SD/TD | 0.80 |
| (V2 + V3)/V1 | 0.84 | f/ImgH | 2.41 |
| CT3/T34 | 0.87 | EPD/ImgH | 0.86 |
| T34/ET34 | 4.31 | TL/f | 0.91 |
| (T23 + T45)/T34 | 3.39 | TL [mm] | 6.20 |
| f/R1 | 4.10 | | |

4th Embodiment

Figure 4A:
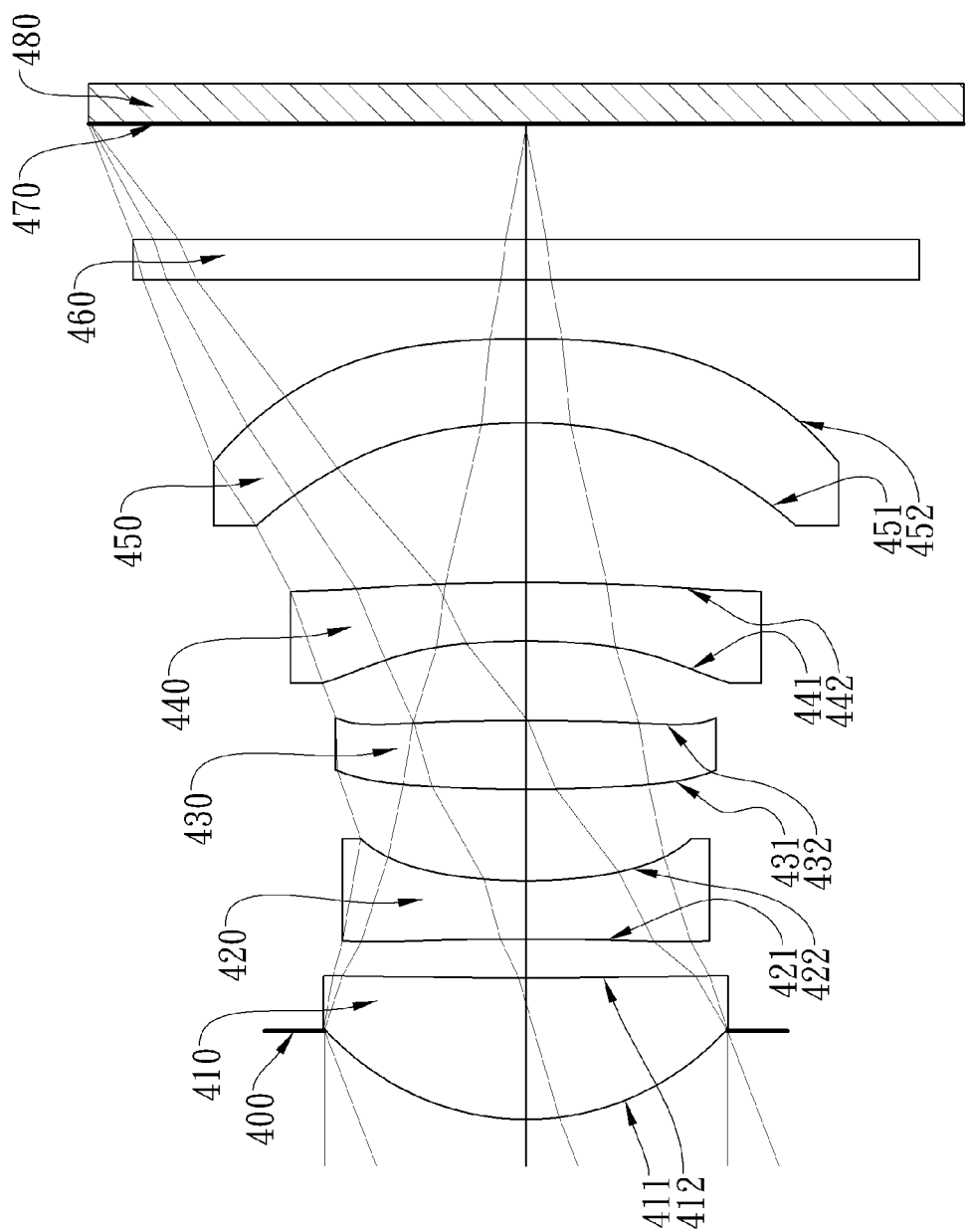
FIG. 4A is a schematic view of an image capturing device according to the 4th embodiment of the present disclosure.
Figure 4B:
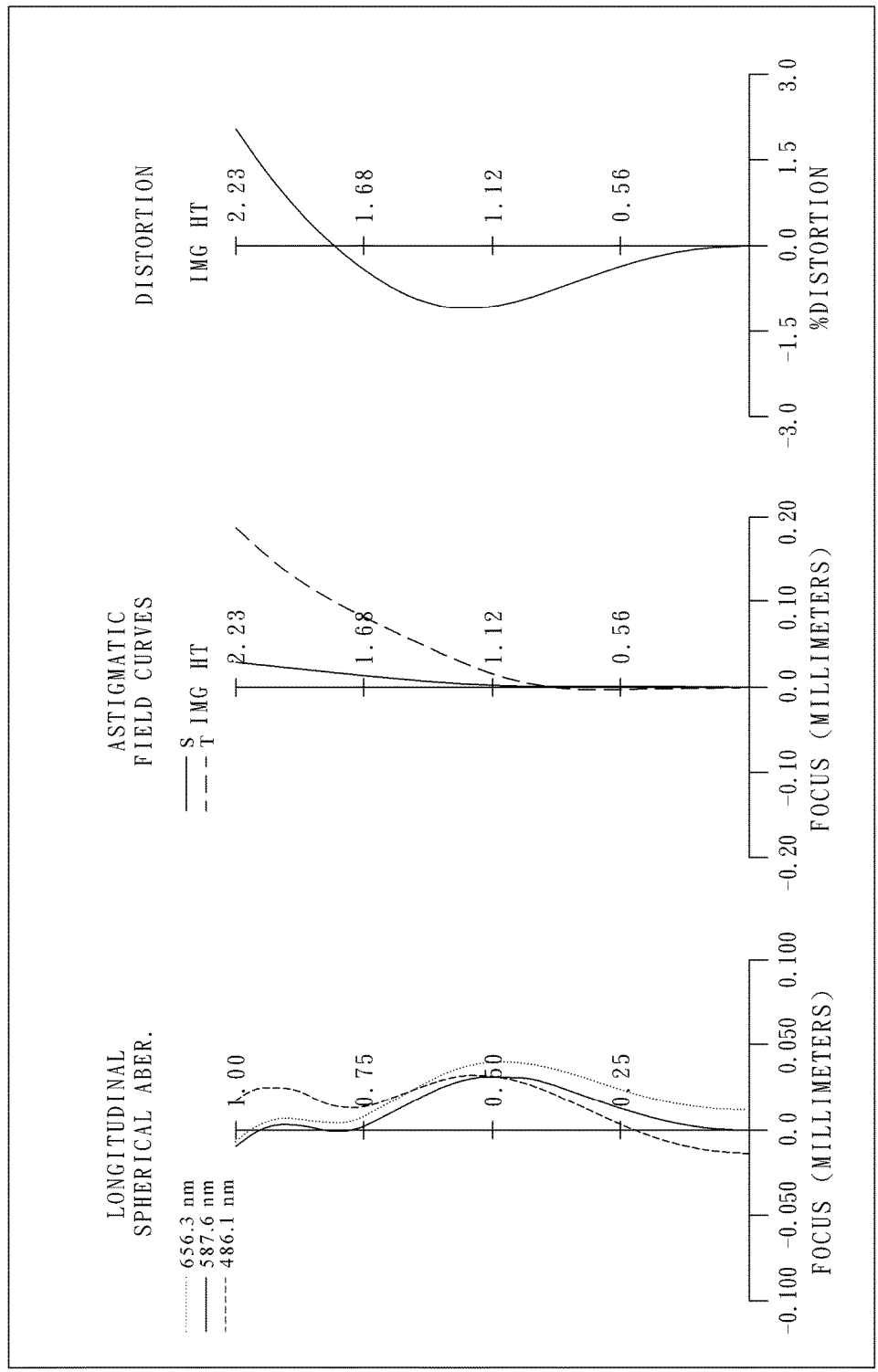
FIG. 4B shows longitudinal spherical aberration curves, astigmatic field curves and a distortion curve of the image capturing device according to the 4th embodiment.

FIG. 4A is a schematic view of an image capturing device according to the 4th embodiment of the present disclosure. FIG. 4B shows, in order from left to right, longitudinal spherical aberration curves, astigmatic field curves and a distortion curve of the image capturing device according to the 4th embodiment.

In FIG. 4A, the image capturing device includes an imaging lens system (not otherwise herein labeled) of the present disclosure and an image sensor 480. The imaging lens system includes, in order from an object side to an image side, a first lens element 410, a second lens element 420, a third lens element 430, a fourth lens element 440, and a fifth lens element 450, wherein the imaging lens system has a total of five lens elements (410-450) with refractive power.

The first lens element 410 with positive refractive power has an object-side surface 411 being convex in a paraxial region thereof and an image-side surface 412 being concave in a paraxial region thereof, which are both aspheric, and the first lens element 410 is made of plastic material.

The second lens element 420 with negative refractive power has an object-side surface 421 being concave in a paraxial region thereof and an image-side surface 422 being concave in a paraxial region thereof, which are both aspheric, and the second lens element 420 is made of plastic material.

The third lens element 430 with positive refractive power has an object-side surface 431 being convex in a paraxial region thereof and an image-side surface 432 being convex in a paraxial region thereof, which are both aspheric, and the third lens element 430 is made of plastic material. Furthermore, the image-side surface 432 of the third lens element 430 has at least one inflection point.

The fourth lens element 440 with negative refractive power has an object-side surface 441 being concave in a paraxial region thereof and an image-side surface 442 being convex in a paraxial region thereof, which are both aspheric, and the fourth lens element 440 is made of plastic material.

The fifth lens element 450 with negative refractive power has an object-side surface 451 being concave in a paraxial region thereof and an image-side surface 452 being convex in a paraxial region thereof, which are both aspheric, and the fifth lens element 450 is made of plastic material.

The imaging lens system is further provided with an aperture stop 400 disposed between an imaged object and the first lens element 410, and no lens element with refractive power is disposed between the aperture stop 400 and the first lens element 410. The imaging lens system further includes an IR-cut filter 460 located between the fifth lens element 450 and an image surface 470. The IR-cut filter 460 is made of glass and will not affect the focal length of the imaging lens system. The image sensor 480 is disposed on or near the image surface 470 of the imaging lens system.

The detailed optical data of the fourth embodiment are shown in TABLE 9, and the aspheric surface data are shown in TABLE 10, wherein the units of the curvature radius, the thickness and the focal length are expressed in mm, and HFOV is half of the maximal field of view.

TABLE 9

| (Embodiment 4) f = 5.67 mm, Fno = 2.75, HFOV = 21.0 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.454 | | | | |
| 2 | Lens 1 | 1.346 | ASP | 0.723 | Plastic | 1.535 | 55.7 | 2.75 |

TABLE 9-continued (Embodiment 4)
f = 5.67 mm, Fno = 2.75, HFOV = 21.0 deg.

| Surface # | | Curvature Radius | | Thickness | Material | Index | Abbe # | Focal Length |
|---|---|---|---|---|---|---|---|---|
| 3 | | 12.631 | ASP | 0.200 | | | | |
| 4 | Lens 2 | −56.028 | ASP | 0.300 | Plastic | 1.650 | 21.4 | −3.82 |
| 5 | | 2.601 | ASP | 0.467 | | | | |
| 6 | Lens 3 | 6.200 | ASP | 0.352 | Plastic | 1.650 | 21.4 | 8.58 |
| 7 | | −54.235 | ASP | 0.409 | | | | |
| 8 | Lens 4 | −4.023 | ASP | 0.300 | Plastic | 1.535 | 55.7 | −11.21 |
| 9 | | −12.539 | ASP | 0.819 | | | | |
| 10 | Lens 5 | −2.529 | ASP | 0.430 | Plastic | 1.650 | 21.4 | −7.07 |
| 11 | | −6.001 | ASP | 0.300 | | | | |
| 12 | IR-cut filter | Plano | | 0.210 | Glass | 1.517 | 64.2 | — |
| 13 | | Plano | | 0.592 | | | | |
| 14 | Image Surface | Plano | | — | | | | |

Note:
Reference wavelength is d-line 587.6 nm

TABLE 10

Aspheric Coefficients

| | Surface # | | | | |
|---|---|---|---|---|---|
| | 2 | 3 | 4 | 5 | 6 |
| k= | −3.2716E+00 | 9.0447E+00 | −9.0000E+01 | 5.7774E+00 | −9.0000E+01 |
| A4= | 1.5281E−01 | −1.1364E−01 | −1.6509E−01 | −7.5323E−02 | −2.6850E−02 |
| A6= | −5.4494E−02 | 2.6444E−01 | 5.2215E−01 | 3.2358E−01 | 1.3283E−02 |
| A8= | 7.5892E−02 | −4.2437E−01 | −8.5278E−01 | −3.0769E−01 | 1.6049E−01 |
| A10= | −7.4691E−02 | 4.2551E−01 | 9.4207E−01 | 2.5409E−01 | −1.1328E−01 |
| A12= | 4.0083E−02 | −2.2902E−01 | −6.0447E−01 | −1.2377E−01 | 2.0060E−02 |
| A14= | −7.4681E−03 | 4.9277E−02 | 1.6157E−01 | 4.9511E−02 | |

| | Surface # | | | | |
|---|---|---|---|---|---|
| | 7 | 8 | 9 | 10 | 11 |
| k= | −2.0005E+01 | −3.7328E+00 | 8.4874E+01 | 1.1050E+00 | 9.1787E+00 |
| A4= | −1.0276E−01 | −1.0413E−01 | 2.7757E−02 | −6.1099E−02 | −1.0450E−01 |
| A6= | 5.5707E−02 | −1.6627E−01 | −1.2399E−01 | 3.2981E−02 | 3.8340E−02 |
| A8= | 8.7292E−02 | 2.7029E−01 | 1.9859E−01 | −1.3041E−02 | −1.1911E−02 |
| A10= | 1.6893E−02 | −3.8917E−02 | −1.2253E−01 | 9.5289E−03 | 2.9380E−03 |
| A12= | −1.9632E−02 | −6.7163E−02 | 3.2266E−02 | −3.6212E−03 | −4.9095E−04 |
| A14= | | 2.4584E−02 | −2.9495E−03 | 4.4794E−04 | 2.1094E−05 |

In the 4th embodiment, the equation of the aspheric surface profiles of the aforementioned lens elements is the same as the equation of the 1st embodiment. Also, the definitions of these parameters shown in Table 11 below are the same as those stated in the 1st embodiment with corresponding values for the 4th embodiment, so an explanation in this regard will not be provided again.

Moreover, these parameters can be calculated from Table 9 and Table 10 and satisfy the conditions stated in Table 11.

TABLE 11

| $4^{th}$ Embodiment | | | |
|---|---|---|---|
| f [mm] | 5.67 | f/R8 | −0.45 |
| Fno | 2.75 | R10/R8 | 0.48 |
| HFOV [deg.] | 21.0 | (R9 − R10)/(R9 + R10) | −0.41 |
| tan(2*HFOV) | 0.900 | f4/f5 | 1.58 |
| Nmax | 1.650 | SD/TD | 0.89 |
| (V2 + V3)/V1 | 0.77 | f/ImgH | 2.54 |
| CT3/T34 | 0.86 | EPD/ImgH | 0.92 |
| T34/ET34 | 2.28 | TL/f | 0.90 |
| (T23 + T45)/T34 | 3.14 | TL [mm] | 5.10 |
| f/R1 | 4.21 | | |

5th Embodiment

Figure 5A:
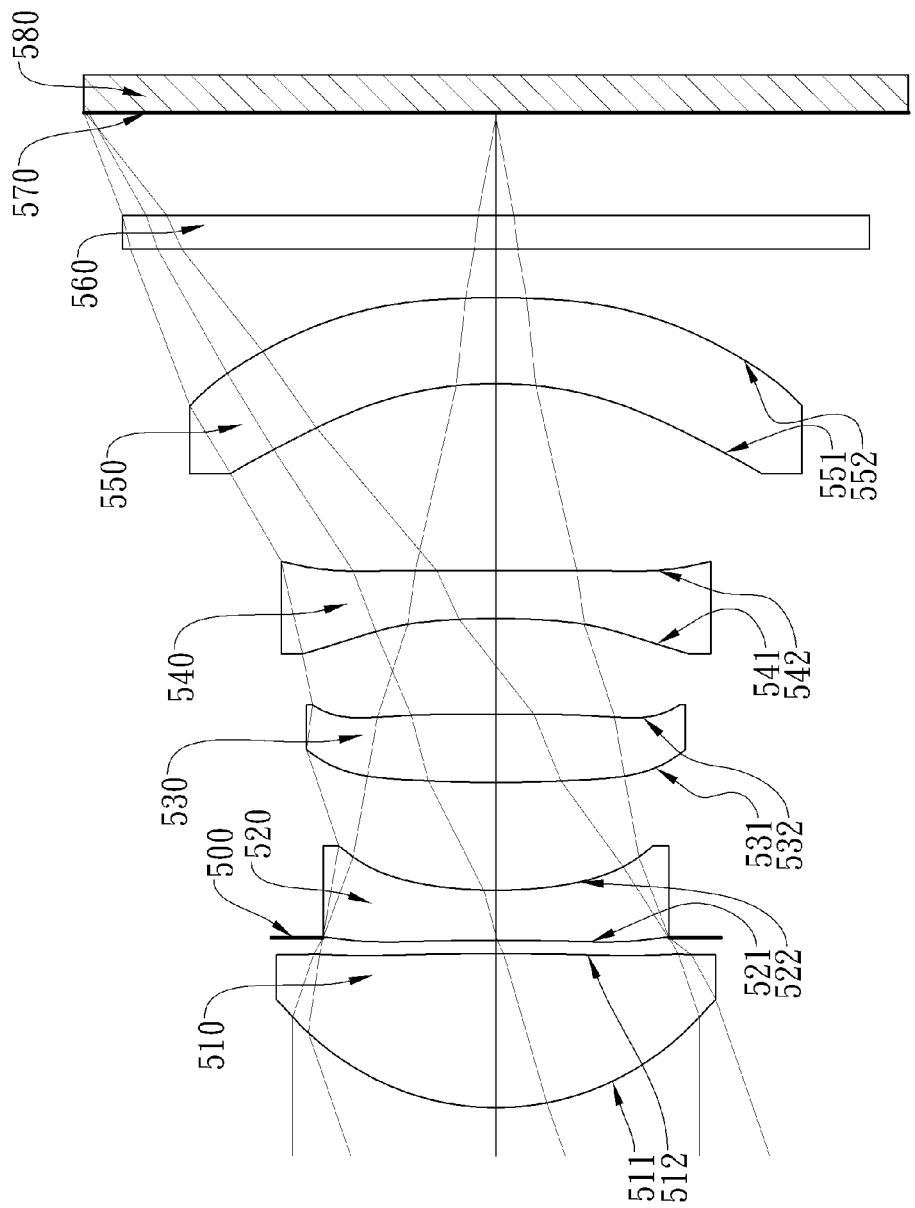
FIG. 5A is a schematic view of an image capturing device according to the 5th embodiment of the present disclosure.
Figure 5B:
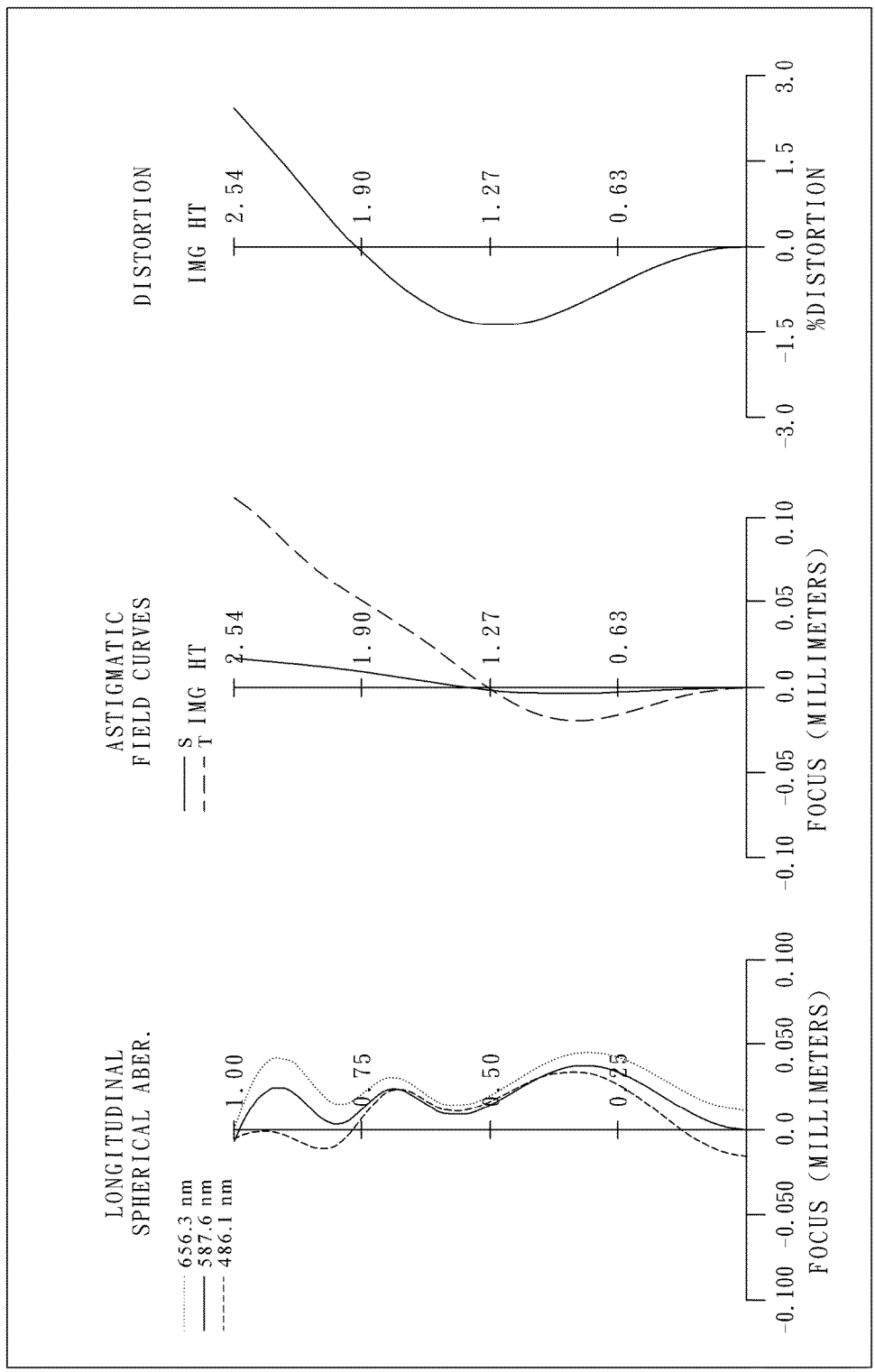
FIG. 5B shows longitudinal spherical aberration curves, astigmatic field curves and a distortion curve of the image capturing device according to the 5th embodiment.

FIG. 5A is a schematic view of an image capturing device according to the 5th embodiment of the present disclosure. FIG. 5B shows, in order from left to right, longitudinal spherical aberration curves, astigmatic field curves and a distortion curve of the image capturing device according to the 5th embodiment.

In FIG. 5A, the image capturing device includes an imaging lens system (not otherwise herein labeled) of the present disclosure and an image sensor 580. The imaging lens system includes, in order from an object side to an image side, a first lens element 510, a second lens element 520, a third lens element 530, a fourth lens element 540, and a fifth lens element 550, wherein the imaging lens system has a total of five lens elements (510-550) with refractive power.

The first lens element 510 with positive refractive power has an object-side surface 511 being convex in a paraxial region thereof and an image-side surface 512 being convex in a paraxial region thereof, which are both aspheric, and the first lens element 510 is made of plastic material.

The second lens element 520 with negative refractive power has an object-side surface 521 being concave in a paraxial region thereof and an image-side surface 522 being concave in a paraxial region thereof, which are both aspheric, and the second lens element 520 is made of plastic material.

The third lens element 530 with positive refractive power has an object-side surface 531 being convex in a paraxial region thereof and an image-side surface 532 being concave in a paraxial region thereof, which are both aspheric, and the third lens element 530 is made of plastic material. Furthermore, the image-side surface 532 of the third lens element 530 has at least one inflection point.

The fourth lens element 540 with negative refractive power has an object-side surface 541 being concave in a paraxial region thereof and an image-side surface 542 being concave in a paraxial region thereof, which are both aspheric, and the fourth lens element 540 is made of plastic material.

The fifth lens element 550 with negative refractive power has an object-side surface 551 being concave in a paraxial region thereof and an image-side surface 552 being convex in a paraxial region thereof, which are both aspheric, and the fifth lens element 550 is made of plastic material.

The imaging lens system is further provided with an aperture stop 500 disposed between the first lens element 510 and the second lens element 520, and no lens element with refractive power is disposed between the aperture stop 500 and the first lens element 510. The imaging lens system further includes an IR-cut filter 560 located between the fifth lens element 550 and an image surface 570. The IR-cut filter 560 is made of glass and will not affect the focal length of the imaging lens system. The image sensor 580 is disposed on or near the image surface 570 of the imaging lens system.

The detailed optical data of the fifth embodiment are shown in TABLE 12, and the aspheric surface data are shown in TABLE 13, wherein the units of the curvature radius, the thickness and the focal length are expressed in mm, and HFOV is half of the maximal field of view.

TABLE 12

(Embodiment 5)
f = 7.13 mm, Fno = 2.82, HFOV = 19.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.665 | ASP | 0.957 | Plastic | 1.544 | 55.9 | 3.02 |
| 2 | | −112.370 | ASP | 0.100 | | | | |
| 3 | Ape. Stop | Plano | | −0.018 | | | | |
| 4 | Lens 2 | −118.385 | ASP | 0.313 | Plastic | 1.639 | 23.5 | −4.07 |
| 5 | | 2.660 | ASP | 0.671 | | | | |
| 6 | Lens 3 | 6.926 | ASP | 0.424 | Plastic | 1.639 | 23.5 | 11.58 |
| 7 | | 105.471 | ASP | 0.596 | | | | |
| 8 | Lens 4 | −6.127 | ASP | 0.300 | Plastic | 1.544 | 55.9 | −10.80 |
| 9 | | 146.368 | ASP | 1.163 | | | | |
| 10 | Lens 5 | −2.485 | ASP | 0.535 | Plastic | 1.535 | 55.7 | −7.88 |
| 11 | | −6.508 | ASP | 0.300 | | | | |
| 12 | IR-cut filter | Plano | | 0.210 | Glass | 1.517 | 64.2 | — |
| 13 | | Plano | | 0.641 | | | | |
| 14 | Image Surface | Plano | | — | | | | |

Note:
Reference wavelength is d-line 587.6 nm

TABLE 13

Aspheric Coefficients

| | Surface # | | | | |
|---|---|---|---|---|---|
| | 1 | 2 | 4 | 5 | 6 |
| k= | −5.1391E+00 | −9.0000E+01 | −9.0000E+01 | 5.2125E+00 | 8.9897E+00 |
| A4= | 1.3136E−01 | −1.1634E−01 | −1.6267E−01 | −8.0311E−02 | −6.4910E−02 |
| A6= | −6.9842E−02 | 2.9697E−01 | 5.2503E−01 | 2.7615E−01 | 2.6779E−03 |
| A8= | 7.5535E−02 | −4.2120E−01 | −8.3915E−01 | −3.1062E−01 | 1.6944E−01 |
| A10= | −7.2737E−02 | 4.2028E−01 | 9.4930E−01 | 2.8257E−01 | −1.0712E−01 |
| A12= | 4.0547E−02 | −2.3254E−01 | −6.0646E−01 | −1.3380E−01 | 1.9231E−02 |
| A14= | −8.7919E−03 | 4.9679E−02 | 1.5252E−01 | −1.3059E−02 | |

TABLE 13-continued

Aspheric Coefficients

| | Surface # | | | | |
|---|---|---|---|---|---|
| | 7 | 8 | 9 | 10 | 11 |
| k= | −9.0000E+01 | 3.2314E+00 | 9.0000E+01 | 9.3680E−01 | 8.5844E+00 |
| A4= | −1.0014E−01 | −8.2511E−02 | 5.1580E−03 | −2.3050E−02 | −7.6895E−02 |
| A6= | 1.7965E−02 | −1.6511E−02 | −1.1917E−01 | 2.8865E−02 | 3.5085E−02 |
| A8= | 8.0595E−02 | 2.5622E−01 | 2.0478E−01 | −1.3078E−02 | −1.1031E−02 |
| A10= | 1.3346E−02 | −4.0621E−02 | −1.2247E−01 | 9.6413E−03 | 2.9452E−03 |
| A12= | −2.0164E−02 | −6.7256E−02 | 3.1964E−02 | −3.6377E−03 | −5.1055E−04 |
| A14= | | 2.4794E−02 | −3.1277E−03 | 5.2187E−04 | 3.3365E−05 |

In the 5th embodiment, the equation of the aspheric surface profiles of the aforementioned lens elements is the same as the equation of the 1st embodiment. Also, the definitions of these parameters shown in Table 14 below are the same as those stated in the 1st embodiment with corresponding values for the 5th embodiment, so an explanation in this regard will not be provided again.

Moreover, these parameters can be calculated from Table 12 and Table 13 and satisfy the conditions stated in Table 14.

TABLE 14

Embodiment 5

| f [mm] | 7.13 | f/R8 | 0.05 |
|---|---|---|---|
| Fno | 2.82 | R10/R8 | −0.04 |
| HFOV [deg.] | 19.0 | (R9 − R10)/(R9 + R10) | −0.45 |
| tan(2*HFOV) | 0.781 | f4/f5 | 1.37 |
| Nmax | 1.639 | SD/TD | 0.79 |
| (V2 + V3)/V1 | 0.84 | f/ImgH | 2.82 |
| CT3/T34 | 0.71 | EPD/ImgH | 1.00 |
| T34/ET34 | 1.87 | TL/f | 0.87 |
| (T23 + T45)/T34 | 3.08 | TL [mm] | 6.19 |
| f/R1 | 4.28 | | |

6th Embodiment

Figure 6A:
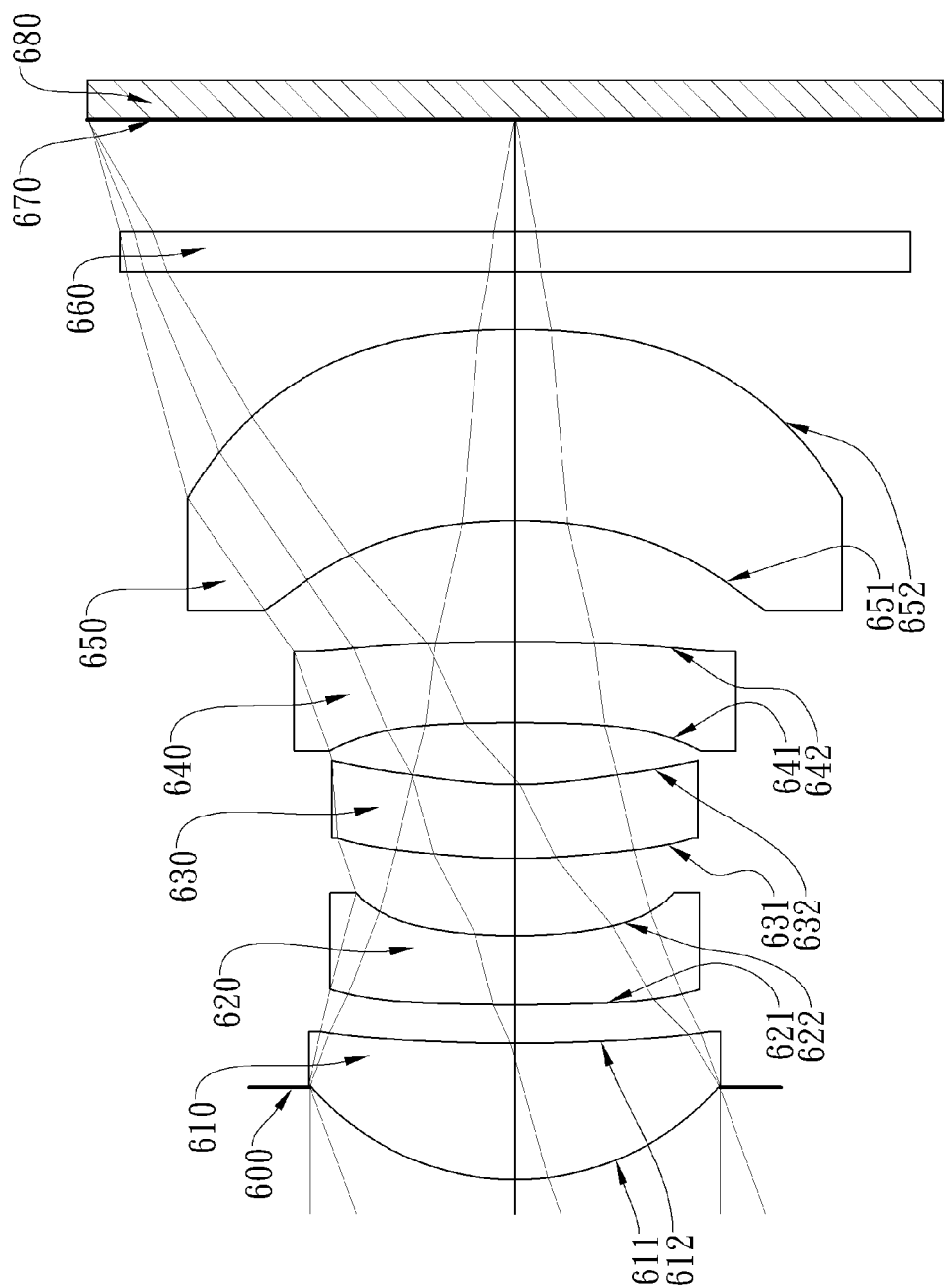
FIG. 6A is a schematic view of an image capturing device according to the 6th embodiment of the present disclosure.
Figure 6B:
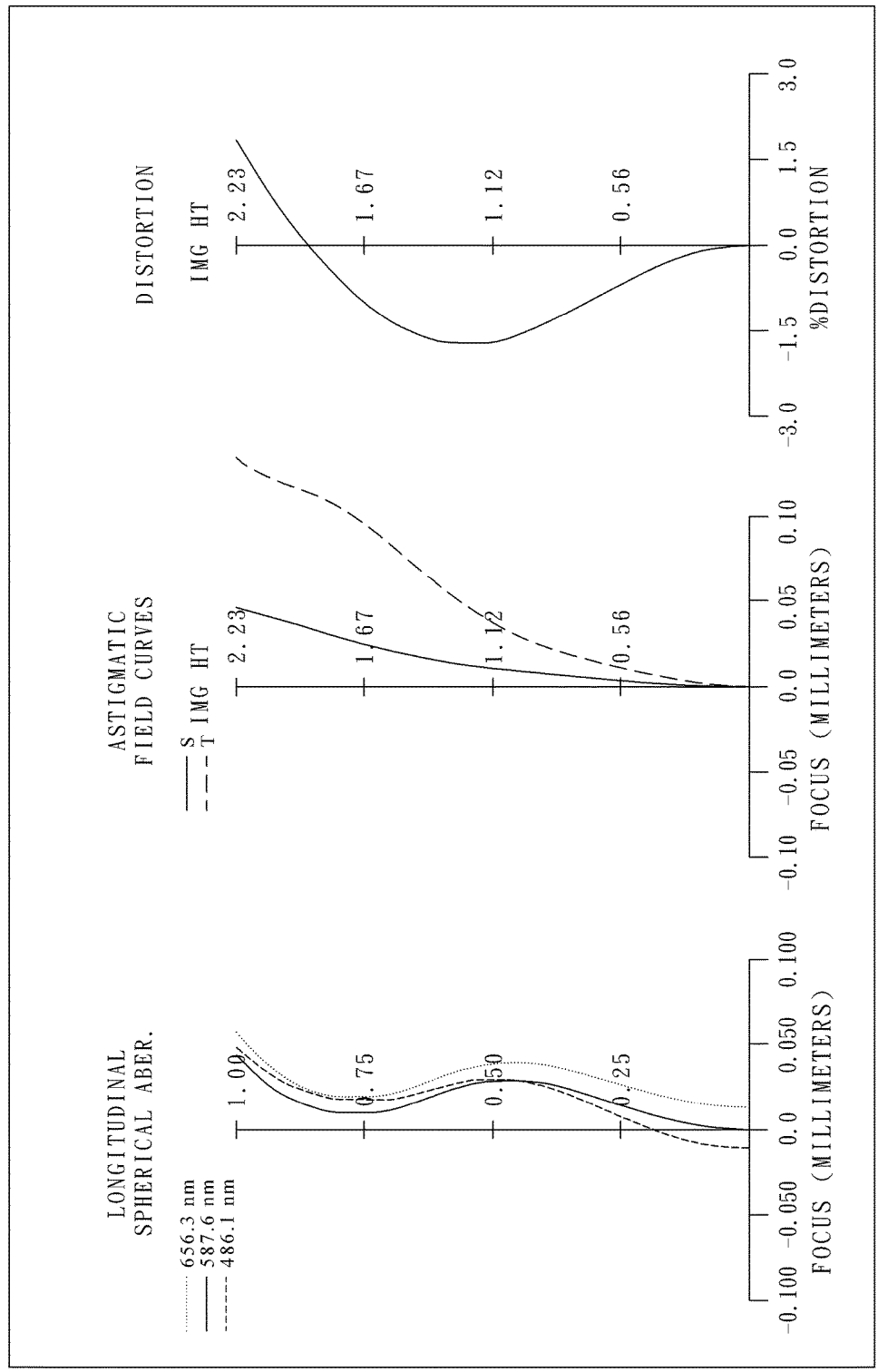
FIG. 6B shows longitudinal spherical aberration curves, astigmatic field curves and a distortion curve of the image capturing device according to the 6th embodiment.

FIG. 6A is a schematic view of an image capturing device according to the 6th embodiment of the present disclosure. FIG. 6B shows, in order from left to right, longitudinal spherical aberration curves, astigmatic field curves and a distortion curve of the image capturing device according to the 6th embodiment.

In FIG. 6A, the image capturing device includes an imaging lens system (not otherwise herein labeled) of the present disclosure and an image sensor 680. The imaging lens system includes, in order from an object side to an image side, a first lens element 610, a second lens element 620, a third lens element 630, a fourth lens element 640, and a fifth lens element 650, wherein the imaging lens system has a total of five lens elements (610-650) with refractive power.

The first lens element 610 with positive refractive power has an object-side surface 611 being convex in a paraxial region thereof and an image-side surface 612 being concave in a paraxial region thereof, which are both aspheric, and the first lens element 610 is made of plastic material.

The second lens element 620 with negative refractive power has an object-side surface 621 being convex in a paraxial region thereof and an image-side surface 622 being concave in a paraxial region thereof, which are both aspheric, and the second lens element 620 is made of plastic material.

The third lens element 630 with negative refractive power has an object-side surface 631 being convex in a paraxial region thereof and an image-side surface 632 being concave in a paraxial region thereof, which are both aspheric, and the third lens element 630 is made of plastic material. Furthermore, the image-side surface 632 of the third lens element 630 has at least one inflection point.

The fourth lens element 640 with negative refractive power has an object-side surface 641 being concave in a paraxial region thereof and an image-side surface 642 being convex in a paraxial region thereof, which are both aspheric, and the fourth lens element 640 is made of plastic material.

The fifth lens element 650 with negative refractive power has an object-side surface 651 being concave in a paraxial region thereof and an image-side surface 652 being convex in a paraxial region thereof, which are both aspheric, and the fifth lens element 650 is made of plastic material.

The imaging lens system is further provided with an aperture stop 600 disposed between an imaged object and the first lens element 610, and no lens element with refractive power is disposed between the aperture stop 600 and the first lens element 610. The imaging lens system further includes an IR-cut filter 660 located between the fifth lens element 650 and an image surface 670. The IR-cut filter 660 is made of glass and will not affect the focal length of the imaging lens system. The image sensor 680 is disposed on or near the image surface 670 of the imaging lens system.

The detailed optical data of the sixth embodiment are shown in TABLE 15, and the aspheric surface data are shown in TABLE 16, wherein the units of the curvature radius, the thickness and the focal length are expressed in mm, and HFOV is half of the maximal field of view.

TABLE 15

(Embodiment 6)
f = 5.99 mm, Fno = 2.80, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.483 | | | | |
| 2 | Lens 1 | 1.377 | ASP | 0.716 | Plastic | 1.544 | 55.9 | 2.99 |
| 3 | | 7.321 | ASP | 0.200 | | | | |
| 4 | Lens 2 | 9.425 | ASP | 0.360 | Plastic | 1.650 | 21.4 | −5.83 |

TABLE 15-continued (Embodiment 6)
f = 5.99 mm, Fno = 2.80, HFOV = 20.0 deg.

| Surface # | | Curvature Radius | Thickness | | Material | Index | Abbe # | Focal Length |
|---|---|---|---|---|---|---|---|---|
| 5 | | 2.661 | ASP | 0.405 | | | | |
| 6 | Lens 3 | 3.074 | ASP | 0.390 | Plastic | 1.544 | 55.9 | −17.58 |
| 7 | | 2.222 | ASP | 0.322 | | | | |
| 8 | Lens 4 | −13.629 | ASP | 0.424 | Plastic | 1.650 | 21.4 | −241.45 |
| 9 | | −15.109 | ASP | 0.633 | | | | |
| 10 | Lens 5 | −2.673 | ASP | 1.000 | Plastic | 1.650 | 21.4 | −17.78 |
| 11 | | −3.990 | ASP | 0.300 | | | | |
| 12 | IR-cut filter | Plano | | 0.210 | Glass | 1.517 | 64.2 | — |
| 13 | | Plano | | 0.589 | | | | |
| 14 | Image Surface | Plano | | — | | | | |

Note:
Reference wavelength is d-line 587.6 nm

TABLE 16

Aspheric Coefficients

| Surface # | | | | | |
|---|---|---|---|---|---|
| | 2 | 3 | 4 | 5 | 6 |
| k= | −3.2117E+00 | 1.9927E+01 | 7.7586E+01 | 7.3259E+00 | −3.8573E+01 |
| A4= | 1.4312E−01 | −1.1009E−01 | −1.4375E−01 | −7.4318E−02 | −4.4185E−02 |
| A6= | −5.6992E−02 | 2.6849E−01 | 5.1115E−01 | 3.2404E−01 | 1.3068E−02 |
| A8= | 7.7259E−02 | −4.2289E−01 | −8.4850E−01 | −2.0996E−01 | 1.6035E−01 |
| A10= | −7.3333E−02 | 4.2527E−01 | 9.4810E−01 | 1.7549E−01 | −1.1342E−01 |
| A12= | 4.0580E−02 | −2.2932E−01 | −6.0561E−01 | −1.6513E−01 | 1.9941E−02 |
| A14= | −7.6642E−03 | 4.9670E−02 | 1.5162E−01 | 1.6158E−01 | |

| Surface # | | | | | |
|---|---|---|---|---|---|
| | 7 | 8 | 9 | 10 | 11 |
| k= | −9.1776E+00 | 9.0000E+01 | 9.0000E+01 | 2.2088E+00 | 1.5287E+00 |
| A4= | −1.1625E−01 | −7.0481E−02 | 3.4386E−03 | −6.6382E−02 | −8.4166E−02 |
| A6= | 3.5027E−02 | −2.1485E−01 | −1.2301E−01 | 3.0921E−02 | 2.9545E−02 |
| A8= | 7.7460E−02 | 2.5489E−01 | 1.9832E−01 | −1.2877E−02 | −1.1419E−02 |
| A10= | 1.2882E−02 | −4.4808E−02 | −1.2119E−01 | 9.5510E−03 | 2.9094E−03 |
| A12= | −4.8393E−02 | −7.1269E−02 | 3.3164E−02 | −3.6212E−03 | −5.4096E−04 |
| A14= | | 2.2712E−02 | −2.4835E−03 | 1.4846E−03 | 4.1684E−05 |

In the 6th embodiment, the equation of the aspheric surface profiles of the aforementioned lens elements is the same as the equation of the 1st embodiment. Also, the definitions of these parameters shown in Table 17 below are the same as those stated in the 1st embodiment with corresponding values for the 6th embodiment, so an explanation in this regard will not be provided again.

Moreover, these parameters can be calculated from Table 15 and Table 16 and satisfy the conditions stated in Table 17.

TABLE 17

| $6^{th}$ Embodiment | | | |
|---|---|---|---|
| f [mm] | 5.99 | f/R8 | −0.40 |
| Fno | 2.80 | R10/R8 | 0.26 |
| HFOV [deg.] | 20.0 | (R9 − R10)/(R9 + R10) | −0.20 |
| tan(2*HFOV) | 0.839 | f4/f5 | 13.58 |
| Nmax | 1.650 | SD/TD | 0.89 |
| (V2 + V3)/V1 | 1.38 | f/ImgH | 2.68 |
| CT3/T34 | 1.21 | EPD/ImgH | 0.96 |
| T34/ET34 | 6.39 | TL/f | 0.93 |
| (T23 + T45)/T34 | 3.22 | TL [mm] | 5.55 |
| f/R1 | 4.35 | | |

7th Embodiment

Figure 7A:
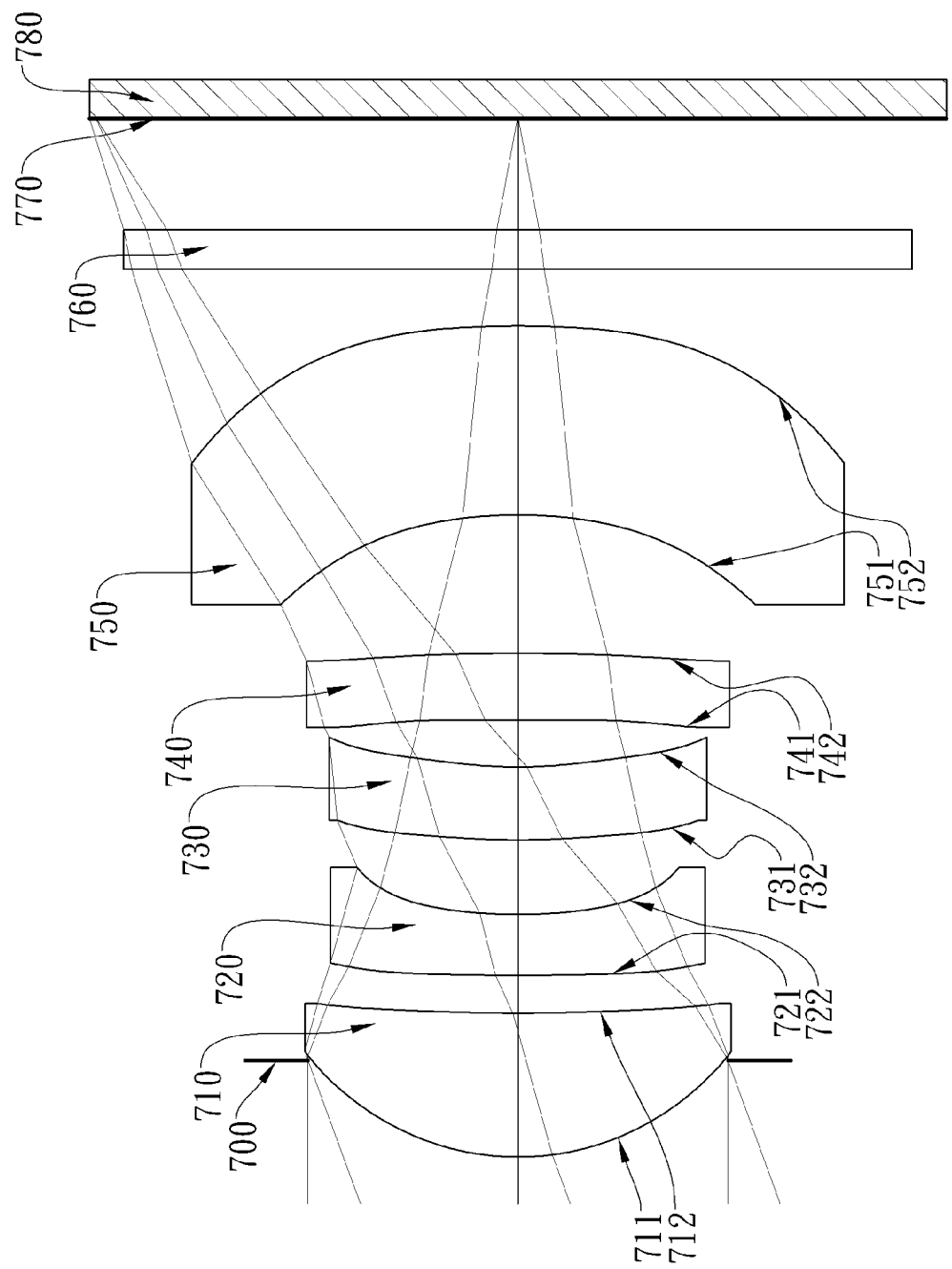
FIG. 7A is a schematic view of an image capturing device according to the 7th embodiment of the present disclosure.
Figure 7B:
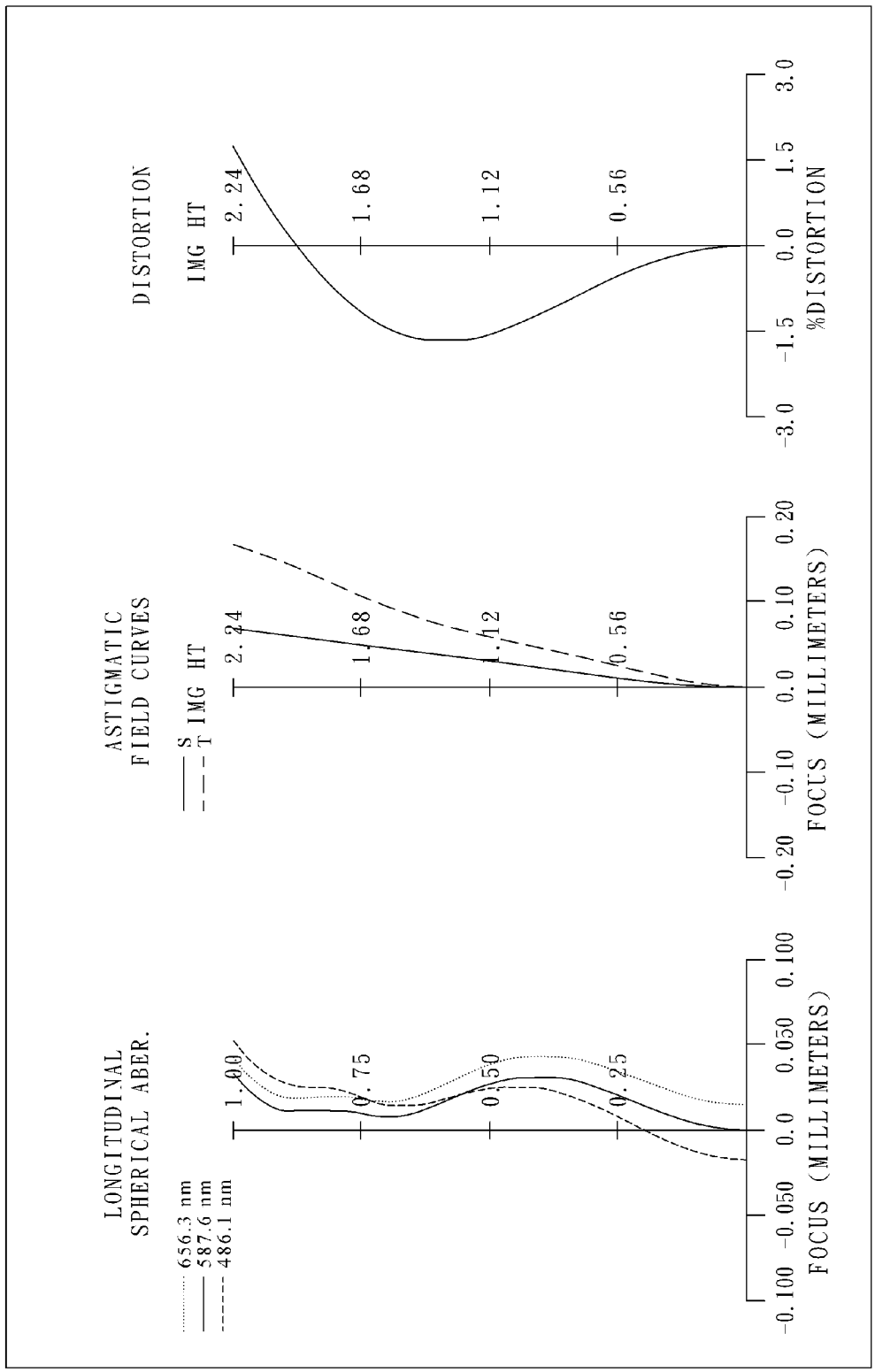
FIG. 7B shows longitudinal spherical aberration curves, astigmatic field curves and a distortion curve of the image capturing device according to the 7th embodiment.

FIG. 7A is a schematic view of an image capturing device according to the 7th embodiment of the present disclosure. FIG. 7B shows, in order from left to right, longitudinal spherical aberration curves, astigmatic field curves and a distortion curve of the image capturing device according to the 7th embodiment.

In FIG. 7A, the image capturing device includes an imaging lens system (not otherwise herein labeled) of the present disclosure and an image sensor 780. The imaging lens system includes, in order from an object side to an image side, a first lens element 710, a second lens element 720, a third lens element 730, a fourth lens element 740, and a fifth lens element 750, wherein the imaging lens system has a total of five lens elements (710-750) with refractive power.

The first lens element 710 with positive refractive power has an object-side surface 711 being convex in a paraxial region thereof and an image-side surface 712 being concave in a paraxial region thereof, which are both aspheric, and the first lens element 710 is made of plastic material.

The second lens element 720 with negative refractive power has an object-side surface 721 being convex in a paraxial region thereof and an image-side surface 722 being concave in a paraxial region thereof, which are both aspheric, and the second lens element 720 is made of plastic material.

The third lens element 730 with negative refractive power has an object-side surface 731 being convex in a paraxial region thereof and an image-side surface 732 being concave in a paraxial region thereof, which are both aspheric, and the third lens element 730 is made of plastic material.

The fourth lens element 740 with positive refractive power has an object-side surface 741 being convex in a paraxial region thereof and an image-side surface 742 being convex in a paraxial region thereof, which are both aspheric, and the fourth lens element 740 is made of plastic material.

The fifth lens element 750 with negative refractive power has an object-side surface 751 being concave in a paraxial region thereof and an image-side surface 752 being convex in a paraxial region thereof, which are both aspheric, and the fifth lens element 750 is made of plastic material.

The imaging lens system is further provided with an aperture stop 700 disposed between an imaged object and the first lens element 710, and no lens element with refractive power is disposed between the aperture stop 700 and the first lens element 710. The imaging lens system further includes an IR-cut filter 760 located between the fifth lens element 750 and an image surface 770. The IR-cut filter 760 is made of glass and will not affect the focal length of the imaging lens system. The image sensor 780 is disposed on or near the image surface 770 of the imaging lens system.

The detailed optical data of the seventh embodiment are shown in TABLE 18, and the aspheric surface data are shown in TABLE 19, wherein the units of the curvature radius, the thickness and the focal length are expressed in mm, and HFOV is half of the maximal field of view.

TABLE 18

(Embodiment 7)
f = 6.00 mm, Fno = 2.70, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.512 | | | | |
| 2 | Lens 1 | 1.390 | ASP | 0.761 | Plastic | 1.544 | 55.9 | 2.97 |
| 3 | | 7.965 | ASP | 0.200 | | | | |
| 4 | Lens 2 | 10.132 | ASP | 0.323 | Plastic | 1.650 | 21.4 | −5.53 |
| 5 | | 2.620 | ASP | 0.395 | | | | |
| 6 | Lens 3 | 3.635 | ASP | 0.386 | Plastic | 1.544 | 55.9 | −11.66 |
| 7 | | 2.225 | ASP | 0.248 | | | | |
| 8 | Lens 4 | 29.292 | ASP | 0.354 | Plastic | 1.650 | 21.4 | 13.64 |
| 9 | | −12.645 | ASP | 0.733 | | | | |
| 10 | Lens 5 | −2.589 | ASP | 1.000 | Plastic | 1.650 | 21.4 | −7.61 |
| 11 | | −6.262 | ASP | 0.300 | | | | — |
| 12 | IR-cut filter | Plano | | 0.210 | Glass | 1.517 | 64.2 | — |
| 13 | | Plano | | 0.590 | | | | |
| 14 | Image Surface | Plano | | — | | | | |

Note:
Reference wavelength is d-line 587.6 nm

TABLE 19

Aspheric Coefficients

| | Surface # | | | | |
|---|---|---|---|---|---|
| | 2 | 3 | 4 | 5 | 6 |
| k = | −3.2239E+00 | 1.5290E+01 | 7.9629E+01 | 7.0171E+00 | −9.0000E+01 |
| A4= | 1.4250E−01 | −1.1301E−01 | −1.5660E−01 | −7.4315E−02 | −2.9217E−02 |
| A6= | −5.7129E−02 | 2.6651E−01 | 5.1464E−01 | 3.2404E−01 | 1.3065E−02 |
| A8= | 7.7263E−02 | −4.2341E−01 | −8.5096E−01 | −2.1687E−01 | 1.6035E−01 |
| A10= | −7.3330E−02 | 4.2572E−01 | 9.4572E−01 | 2.1269E−01 | −1.1342E−01 |
| A12= | 4.0621E−02 | −2.2888E−01 | −6.0571E−01 | −1.7233E−01 | 1.9941E−02 |
| A14= | −7.5905E−03 | 4.9695E−02 | 1.5376E−01 | 8.6732E−02 | |

| | Surface # | | | | |
|---|---|---|---|---|---|
| | 7 | 8 | 9 | 10 | 11 |
| k= | −1.6462E+01 | 9.0000E+01 | 8.9547E+01 | 2.2965E+00 | 5.1296E+00 |
| A4= | −1.0280E−01 | −6.8136E−02 | 2.5566E−02 | −6.7369E−02 | −8.7911E−02 |
| A6= | 5.3550E−02 | −1.7039E−01 | −1.2301E−01 | 3.0913E−02 | 2.9413E−02 |
| A8= | 8.6923E−02 | 2.6702E−01 | 1.9962E−01 | −1.2877E−02 | −1.1019E−02 |
| A10= | 1.6726E−02 | −3.9797E−02 | −1.2208E−01 | 9.5510E−03 | 2.9822E−03 |

TABLE 19-continued

Aspheric Coefficients

| A12= | −4.5035E−02 | −6.8867E−02 | 3.2143E−02 | −3.6212E−03 | −5.0165E−04 |
|---|---|---|---|---|---|
| A14= | | 2.4255E−02 | −3.2206E−03 | 1.1188E−03 | 3.3399E−05 |

In the 7th embodiment, the equation of the aspheric surface profiles of the aforementioned lens elements is the same as the equation of the 1st embodiment. Also, the definitions of these parameters shown in Table 20 below are the same as those stated in the 1st embodiment with corresponding values for the 7th embodiment, so an explanation in this regard will not be provided again.

Moreover, these parameters can be calculated from Table 18 and Table 19 and satisfy the conditions stated in Table 20.

TABLE 20

| $7^{th}$ Embodiment | | | |
|---|---|---|---|
| f [mm] | 6.00 | f/R8 | −0.47 |
| Fno | 2.70 | R10/R8 | 0.50 |
| HFOV [deg.] | 20.0 | (R9 − R10)/(R9 + R10) | −0.41 |
| tan(2*HFOV) | 0.839 | f4/f5 | −1.79 |
| Nmax | 1.650 | SD/TD | 0.88 |
| (V2 + V3)/V1 | 1.38 | f/ImgH | 2.69 |
| CT3/T34 | 1.56 | EPD/ImgH | 0.99 |
| T34/ET34 | 4.72 | TL/f | 0.92 |
| (T23 + T45)/T34 | 4.55 | TL [mm] | 5.50 |
| f/R1 | 4.31 | | |

8th Embodiment

Figure 8A:
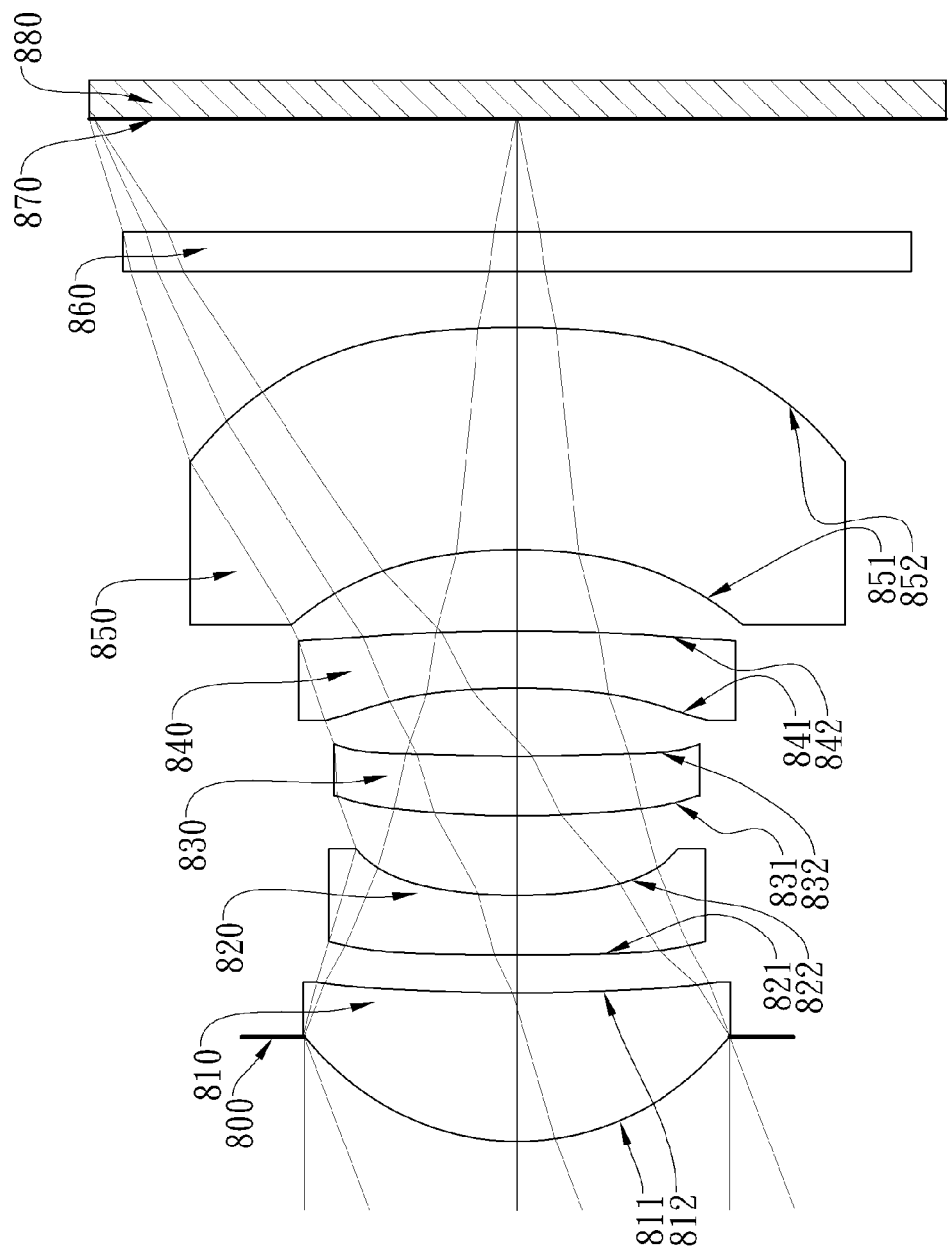
FIG. 8A is a schematic view of an image capturing device according to the 8th embodiment of the present disclosure.
Figure 8B:
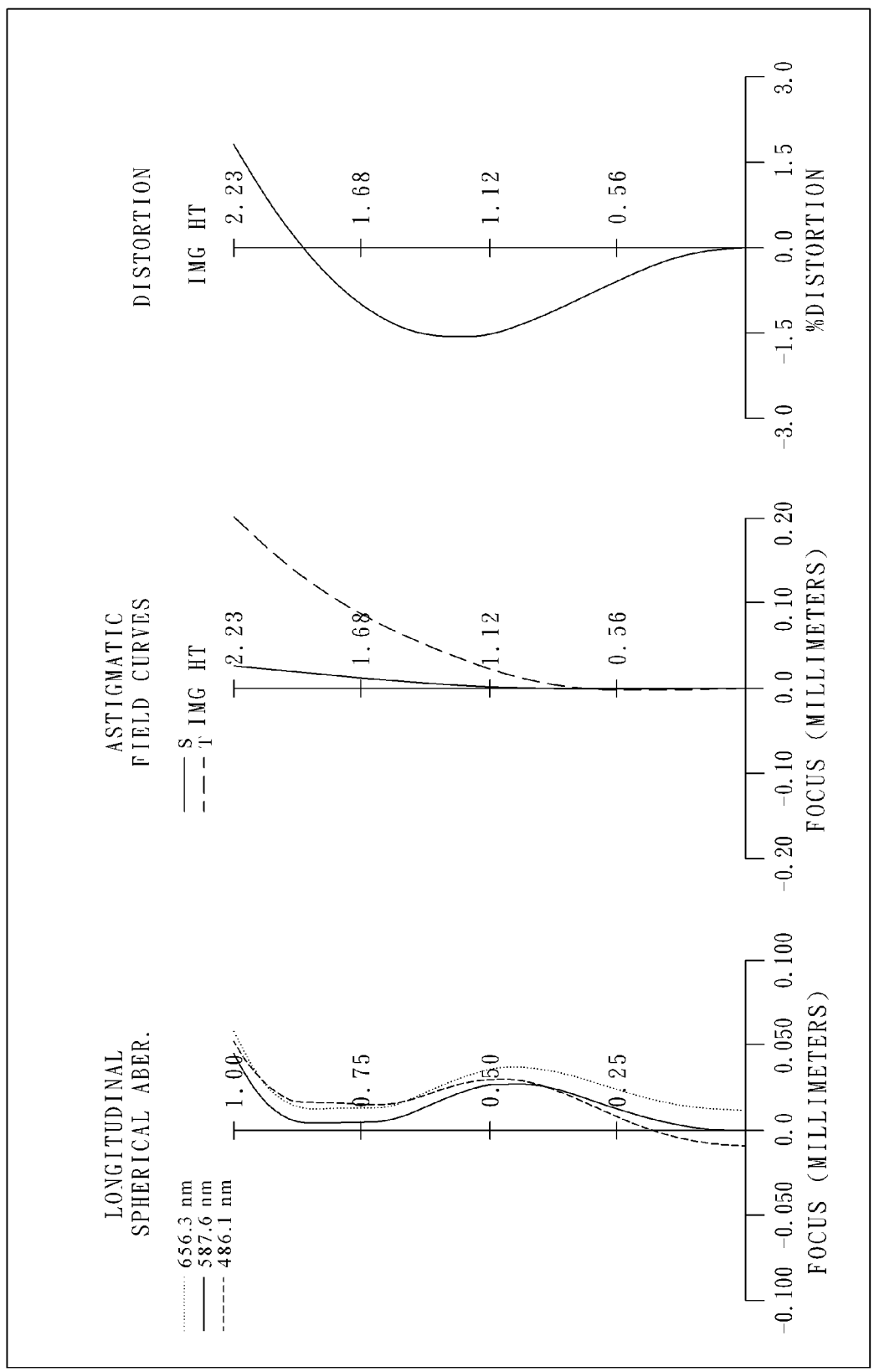
FIG. 8B shows longitudinal spherical aberration curves, astigmatic field curves and a distortion curve of the image capturing device according to the 8th embodiment.

FIG. 8A is a schematic view of an image capturing device according to the 8th embodiment of the present disclosure. FIG. 8B shows, in order from left to right, longitudinal spherical aberration curves, astigmatic field curves and a distortion curve of the image capturing device according to the 8th embodiment.

In FIG. 8A, the image capturing device includes an imaging lens system (not otherwise herein labeled) of the present disclosure and an image sensor 880. The imaging lens system includes, in order from an object side to an image side, a first lens element 810, a second lens element 820, a third lens element 830, a fourth lens element 840, and a fifth lens element 850, wherein the imaging lens system has a total of five lens elements (810-850) with refractive power.

The first lens element 810 with positive refractive power has an object-side surface 811 being convex in a paraxial region thereof and an image-side surface 812 being concave in a paraxial region thereof, which are both aspheric, and the first lens element 810 is made of plastic material.

The second lens element 820 with negative refractive power has an object-side surface 821 being convex in a paraxial region thereof and an image-side surface 822 being concave in a paraxial region thereof, which are both aspheric, and the second lens element 820 is made of plastic material.

The third lens element 830 with positive refractive power has an object-side surface 831 being convex in a paraxial region thereof and an image-side surface 832 being concave in a paraxial region thereof, which are both aspheric, and the third lens element 830 is made of plastic material. Furthermore, the image-side surface 832 of the third lens element 830 has at least one inflection point.

The fourth lens element 840 with negative refractive power has an object-side surface 841 being concave in a paraxial region thereof and an image-side surface 842 being convex in a paraxial region thereof, which are both aspheric, and the fourth lens element 840 is made of plastic material.

The fifth lens element 850 with negative refractive power has an object-side surface 851 being concave in a paraxial region thereof and an image-side surface 852 being convex in a paraxial region thereof, which are both aspheric, and the fifth lens element 850 is made of plastic material.

The imaging lens system is further provided with an aperture stop 800 disposed between an imaged object and the first lens element 810, and no lens element with refractive power is disposed between the aperture stop 800 and the first lens element 810. The imaging lens system further includes an IR-cut filter 860 located between the fifth lens element 850 and an image surface 870. The IR-cut filter 860 is made of glass and will not affect the focal length of the imaging lens system. The image sensor 880 is disposed on or near the image surface 870 of the imaging lens system.

The detailed optical data of the eighth embodiment are shown in TABLE 21, and the aspheric surface data are shown in TABLE 22, wherein the units of the curvature radius, the thickness and the focal length are expressed in mm, and HFOV is half of the maximal field of view.

TABLE 21

(Embodiment 8)
f = 5.84 mm, Fno = 2.60, HFOV = 20.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.550 | | | | |
| 2 | Lens 1 | 1.370 | ASP | 0.781 | Plastic | 1.544 | 55.9 | 2.94 |
| 3 | | 7.581 | ASP | 0.200 | | | | |
| 4 | Lens 2 | 10.873 | ASP | 0.319 | Plastic | 1.650 | 21.4 | −5.35 |
| 5 | | 2.602 | ASP | 0.418 | | | | |
| 6 | Lens 3 | 4.269 | ASP | 0.314 | Plastic | 1.544 | 55.9 | 19.49 |
| 7 | | 6.960 | ASP | 0.364 | | | | |
| 8 | Lens 4 | −4.437 | ASP | 0.300 | Plastic | 1.544 | 55.9 | −13.04 |
| 9 | | −12.124 | ASP | 0.428 | | | | |

TABLE 21-continued (Embodiment 8)
f = 5.84 mm, Fno = 2.60, HFOV = 20.5 deg.

| Surface # | | Curvature Radius | | Thickness | Material | Index | Abbe # | Focal Length |
|---|---|---|---|---|---|---|---|---|
| 10 | Lens 5 | −2.761 | ASP | 1.175 | Plastic | 1.650 | 21.4 | −9.49 |
| 11 | | −5.835 | ASP | 0.300 | | | | |
| 12 | IR-cut filter | Plano | | 0.210 | Glass | 1.517 | 64.2 | — |
| 13 | | Plano | | 0.594 | | | | |
| 14 | Image Surface | Plano | | — | | | | |

Note:
Reference wavelength is 587.6 nm

TABLE 22

Aspheric Coefficients

| Surface # | | | | | |
|---|---|---|---|---|---|
| | 2 | 3 | 4 | 5 | 6 |
| k= | −3.2453E+00 | 1.5831E+01 | 8.3153E+01 | 6.8904E+00 | −6.2459E+01 |
| A4= | 1.4504E−01 | −1.1263E−01 | −1.5594E−01 | −7.4508E−02 | −2.7858E−02 |
| A6= | −5.6702E−02 | 2.6673E−01 | 5.1947E−01 | 3.2424E−01 | 1.2896E−02 |
| A8= | 7.6761E−02 | −4.2309E−01 | −8.4859E−01 | −2.6407E−01 | 1.6036E−01 |
| A10= | −7.3778E−02 | 4.2589E−01 | 9.4746E−01 | 2.3224E−01 | −1.1333E−01 |
| A12= | 4.0345E−02 | −2.2889E−01 | −6.0380E−01 | −1.4157E−01 | 2.0061E−02 |
| A14= | −7.7431E−03 | 4.9554E−02 | 1.5535E−01 | 9.0573E−02 | |

| Surface # | | | | | |
|---|---|---|---|---|---|
| | 7 | 8 | 9 | 10 | 11 |
| k= | −8.1234E+01 | −3.6451E+01 | 8.9797E+01 | 2.5949E+00 | 1.4648E+00 |
| A4= | −1.0284E−01 | −1.0147E−01 | 2.7167E−02 | −6.5458E−02 | −8.0871E−02 |
| A6= | 5.5645E−02 | −1.6754E−01 | −1.2287E−01 | 2.9803E−02 | 2.7861E−02 |
| A8= | 8.7241E−02 | 2.6888E−01 | 1.9895E−01 | −1.3041E−01 | −1.1087E−02 |
| A10= | 1.6876E−02 | −3.9705E−02 | −1.2223E−01 | 9.5289E−03 | 3.0001E−03 |
| A12= | −3.0286E−02 | −6.7363E−02 | 3.2143E−02 | −3.6212E−03 | −4.9739E−04 |
| A14= | | 2.4832E−02 | −3.2177E−03 | 5.5104E−04 | 3.1937E−05 |

In the 8th embodiment, the equation of the aspheric surface profiles of the aforementioned lens elements is the same as the equation of the 1st embodiment. Also, the definitions of these parameters shown in Table 23 below are the same as those stated in the 1st embodiment with corresponding values for the 8th embodiment, so an explanation in this regard will not be provided again.

Moreover, these parameters can be calculated from Table 21 and Table 22 and satisfy the conditions stated in Table 23.

TABLE 23

| 8th Embodiment | | | |
|---|---|---|---|
| f [mm] | 5.84 | f/R8 | −0.48 |
| Fno | 2.60 | R10/R8 | 0.48 |
| HFOV [deg.] | 20.5 | (R9 − R10)/(R9 + R10) | −0.36 |
| tan(2*HFOV) | 0.869 | f4/f5 | 1.37 |
| Nmax | 1.650 | SD/TD | 0.87 |
| (V2 + V3)/V1 | 1.38 | f/ImgH | 2.62 |
| CT3/T34 | 0.86 | EPD/ImgH | 1.01 |
| T34/ET34 | 2.84 | TL/f | 0.92 |
| (T23 + T45)/T34 | 2.32 | TL [mm] | 5.40 |
| f/R1 | 4.27 | | |

9th Embodiment

Figure 9A:
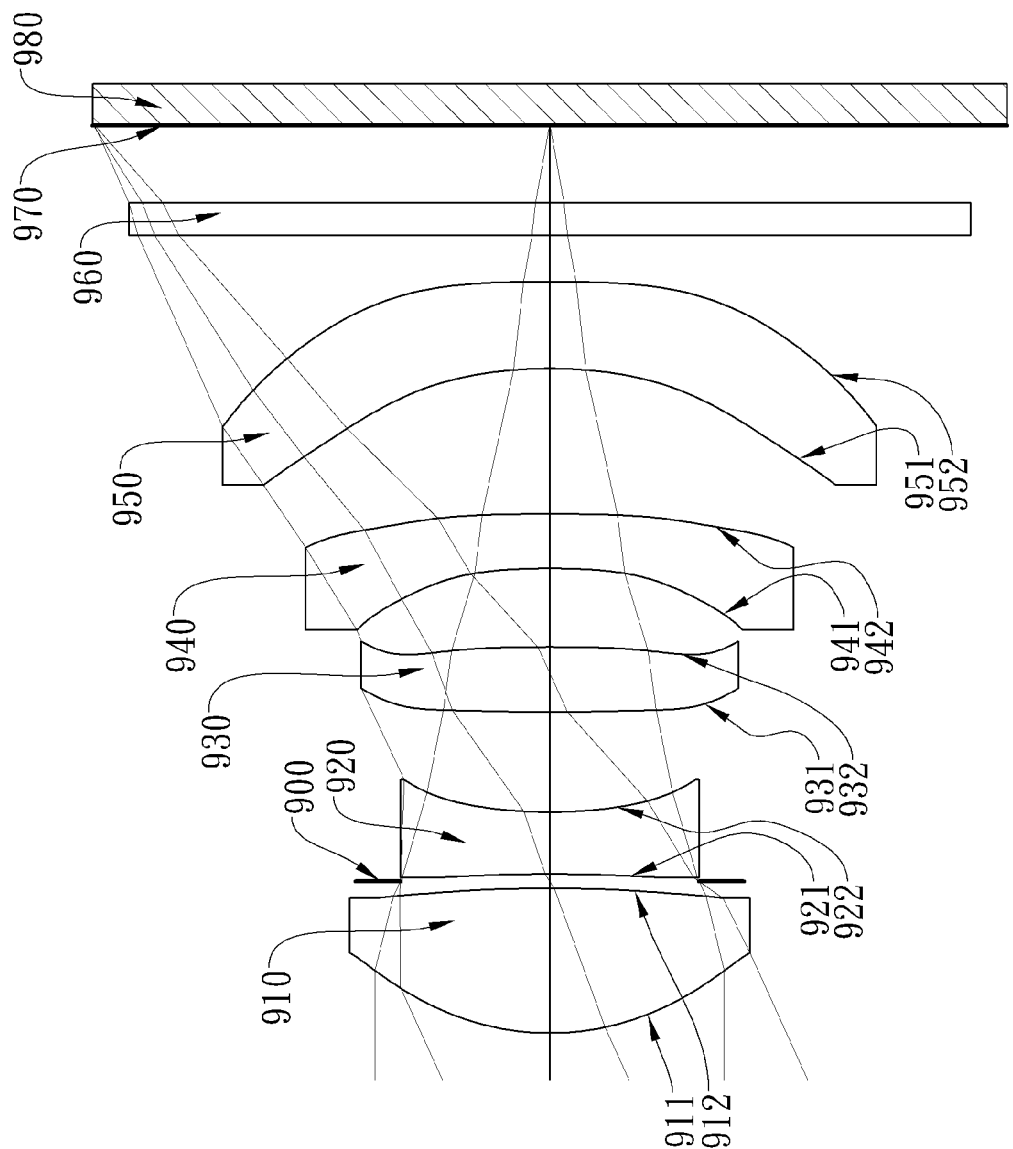
FIG. 9A is a schematic view of an image capturing device according to the 9th embodiment of the present disclosure.
Figure 9B:
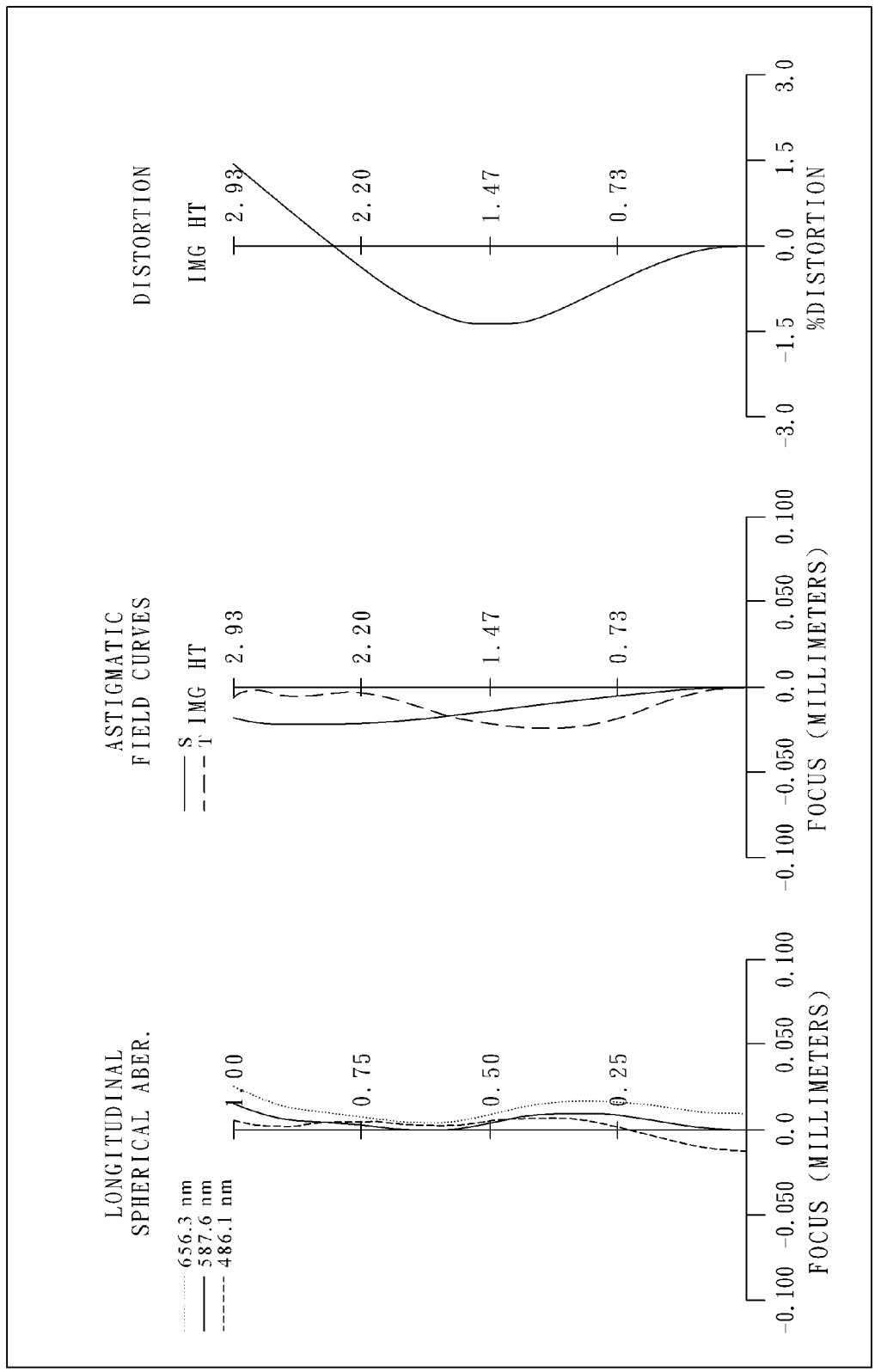
FIG. 9B shows longitudinal spherical aberration curves, astigmatic field curves and a distortion curve of the image capturing device according to the 9th embodiment.

FIG. 9A is a schematic view of an image capturing device according to the 9th embodiment of the present disclosure. FIG. 9B shows, in order from left to right, longitudinal spherical aberration curves, astigmatic field curves and a distortion curve of the image capturing device according to the 9th embodiment.

In FIG. 9A, the image capturing device includes an imaging lens system (not otherwise herein labeled) of the present disclosure and an image sensor 980. The imaging lens system includes, in order from an object side to an image side, a first lens element 910, a second lens element 920, a third lens element 930, a fourth lens element 940, and a fifth lens element 950, wherein the imaging lens system has a total of five lens elements (910-950) with refractive power.

The first lens element 910 with positive refractive power has an object-side surface 911 being convex in a paraxial region thereof and an image-side surface 912 being convex in a paraxial region thereof, which are both aspheric, and the first lens element 910 is made of plastic material.

The second lens element 920 with negative refractive power has an object-side surface 921 being concave in a paraxial region thereof and an image-side surface 922 being concave in a paraxial region thereof, which are both aspheric, and the second lens element 920 is made of plastic material.

The third lens element 930 with positive refractive power has an object-side surface 931 being convex in a paraxial region thereof and an image-side surface 932 being convex in a paraxial region thereof, which are both aspheric, and the third lens element 930 is made of plastic material. Furthermore, each of the object-side surface 931 and the image-side surface 932 of the third lens element 930 has at least one inflection point.

The fourth lens element 940 with negative refractive power has an object-side surface 941 being concave in a paraxial region thereof and an image-side surface 942 being convex in a paraxial region thereof, which are both aspheric, and the fourth lens element 940 is made of plastic material.

The fifth lens element 950 with negative refractive power has an object-side surface 951 being concave in a paraxial region thereof and an image-side surface 952 being convex in a paraxial region thereof, which are both aspheric, and the fifth lens element 950 is made of plastic material.

The imaging lens system is further provided with an aperture stop 900 disposed between the first lens element 910 and the second lens element 920, and no lens element with refractive power is disposed between the aperture stop 900 and the first lens element 910. The imaging lens system further includes an IR-cut filter 960 located between the fifth lens element 950 and an image surface 970. The IR-cut filter 960 is made of glass and will not affect the focal length of the imaging lens system. The image sensor 980 is disposed on or near the image surface 970 of the imaging lens system.

The detailed optical data of the ninth embodiment are shown in TABLE 24, and the aspheric surface data are shown in TABLE 25, wherein the units of the curvature radius, the thickness and the focal length are expressed in mm, and HFOV is half of the maximal field of view.

TABLE 24

(Embodiment 9)
f = 6.33 mm, Fno = 2.82, HFOV = 24.5 deg.

| Surface # | | Curvature Radius | | Thickness | Material | Index | Abbe# | Focal Length |
|---|---|---|---|---|---|---|---|---|
| 0 | Object | Plano | | Infinity | | | | |
| 1 | Lens 1 | 1.687 | ASP | 0.930 | Plastic | 1.544 | 55.9 | 2.86 |
| 2 | | −15.930 | ASP | 0.046 | | | | |
| 3 | Ape. Stop | Plano | | 0.046 | | | | |
| 4 | Lens 2 | −19.768 | ASP | 0.399 | Plastic | 1.639 | 23.5 | −3.85 |
| 5 | | 2.832 | ASP | 0.643 | | | | |
| 6 | Lens 3 | 9.339 | ASP | 0.419 | Plastic | 1.639 | 23.5 | 10.25 |
| 7 | | −21.534 | ASP | 0.506 | | | | |
| 8 | Lens 4 | −5.085 | ASP | 0.350 | Plastic | 1.544 | 55.9 | −12.11 |
| 9 | | −22.826 | ASP | 0.936 | | | | |
| 10 | Lens 5 | −3.090 | ASP | 0.558 | Plastic | 1.535 | 55.7 | −7.15 |
| 11 | | −17.100 | ASP | 0.300 | | | | |
| 12 | IR-cut filter | Plano | | 0.210 | Glass | 1.517 | 64.2 | — |
| 13 | | Plano | | 0.495 | | | | |
| 14 | Image Surface | Plano | | — | | | | |

Note:
Reference Wavelength is d-line 587.6 nm

TABLE 25

Aspheric Coefficients

| | Surface # | | | | |
|---|---|---|---|---|---|
| | 1 | 2 | 4 | 5 | 6 |
| k= | −4.9381E+00 | 1.0013E+01 | 6.9603E+01 | 6.1302E+00 | −2.4360E+01 |
| A4= | 1.2306E−01 | −1.1949E−01 | −1.6738E−01 | −9.6001E−02 | −7.8012E−02 |
| A6= | −7.4165E−02 | 2.9374E−01 | 5.2230E−01 | 2.5759E−01 | 1.2954E−03 |
| A8= | 7.5628E−02 | −4.2786E−01 | −8.4113E−01 | −3.1805E−01 | 1.7101E−01 |
| A10= | −7.2173E−02 | 4.1393E−01 | 9.4486E−01 | 2.9326E−01 | −1.0782E−01 |
| A12= | 4.0535E−02 | −2.2864E−01 | −6.1393E−01 | −1.4070E−01 | 1.8708E−02 |
| A14= | −9.8933E−03 | 5.0837E−02 | 1.6499E−01 | −3.4515E−03 | |

| | Surface # | | | | |
|---|---|---|---|---|---|
| | 7 | 8 | 9 | 10 | 11 |
| k= | 9.0000E+01 | 1.4838E+01 | −8.3513E+00 | 1.4122E+00 | 2.9186E+01 |
| A4= | −1.0881E−01 | −1.1540E−01 | −3.7376E−02 | −5.4970E−02 | −9.8164E−02 |
| A6= | 1.8493E−02 | −1.5883E−01 | −1.2370E−01 | 2.1087E−02 | 3.3451E−02 |
| A8= | 8.0405E−02 | 2.5651E−01 | 2.0542E−01 | −1.2114E−02 | −1.1191E−02 |
| A10= | 1.2550E−02 | −4.1586E−02 | −1.2190E−01 | 1.0690E−02 | 3.0596E−03 |
| A12= | −2.0874E−02 | −6.7489E−02 | 3.2119E−02 | −3.5243E−03 | −4.9514E−04 |
| A14= | | 2.5246E−02 | −3.2178E−03 | 3.9213E−04 | 3.1761E−05 |

In the 9th embodiment, the equation of the aspheric surface profiles of the aforementioned lens elements is the same as the equation of the 1st embodiment. Also, the definitions of these parameters shown in Table 26 below are the same as those stated in the 1st embodiment with corresponding values for the 9th embodiment, so an explanation in this regard will not be provided again.

Moreover, these parameters can be calculated from Table 24 and Table 25 and satisfy the conditions stated in Table 26.

TABLE 26

9$^{th}$ Embodiment

| | | | |
|---|---|---|---|
| f [mm] | 6.33 | f/R8 | −0.28 |
| Fno | 2.82 | R10/R8 | 0.75 |
| HFOV [deg.] | 24.5 | (R9 − R10)/(R9 + R10) | −0.69 |
| tan(2*HFOV) | 1.150 | f4/f5 | 1.69 |
| Nmax | 1.639 | SD/TD | 0.80 |
| (V2 + V3)/V1 | 0.84 | f/ImgH | 2.16 |
| CT3/T34 | 0.83 | EPD/ImgH | 0.77 |
| T34/ET34 | 7.16 | TL/f | 0.92 |
| (T23 + T45)/T34 | 3.12 | TL [mm] | 5.84 |
| f/R1 | 3.75 | | |

10th Embodiment

Figure 10A:
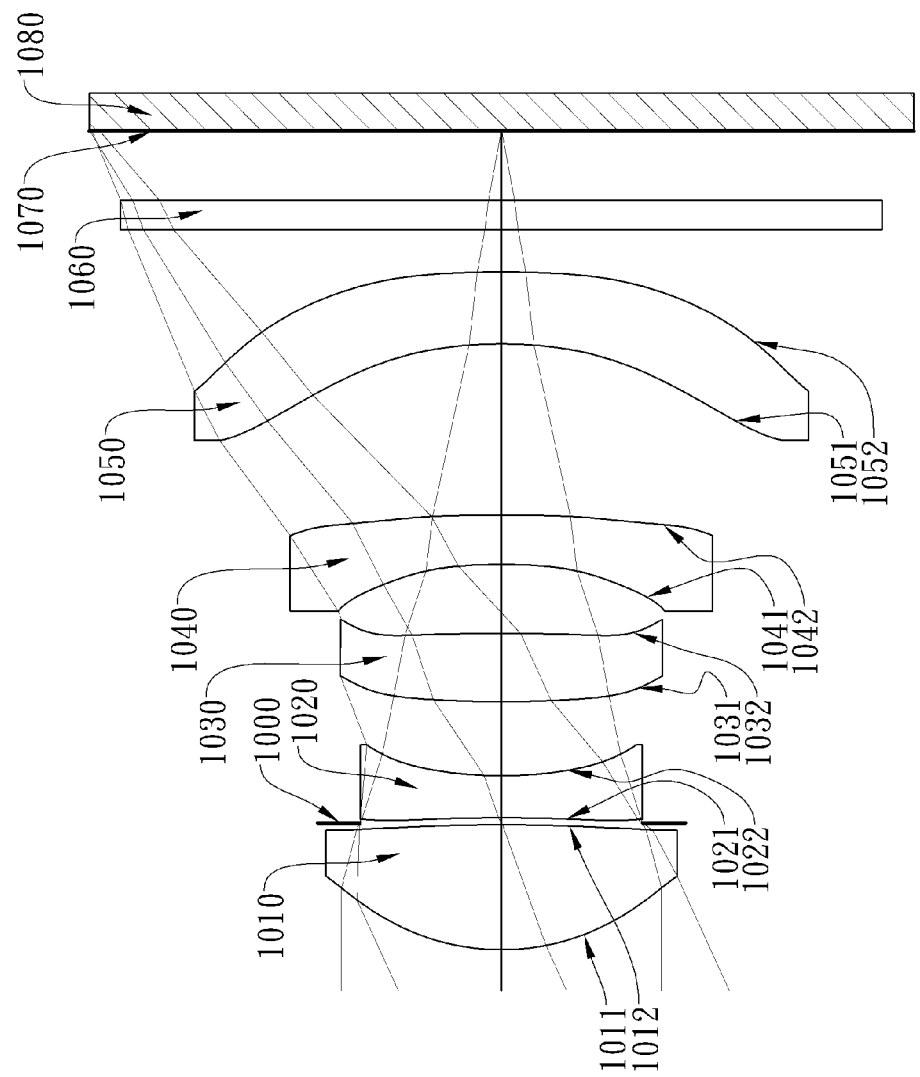
FIG. 10A is a schematic view of an image capturing device according to the 10th embodiment of the present disclosure.
Figure 10B:
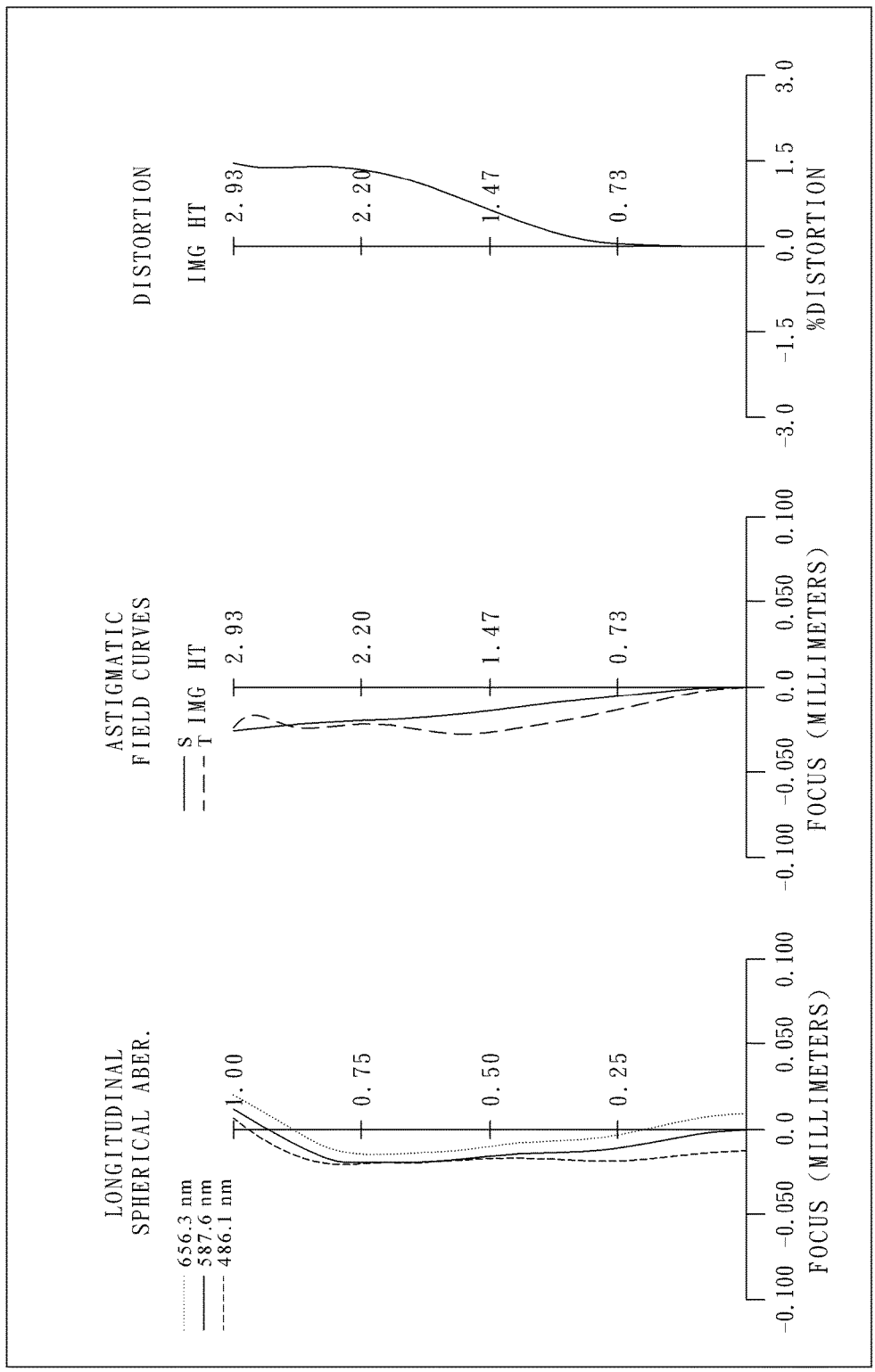
FIG. 10B shows longitudinal spherical aberration curves, astigmatic field curves and a distortion curve of the image capturing device according to the 10th embodiment.

FIG. 10A is a schematic view of an image capturing device according to the 10th embodiment of the present disclosure. FIG. 10B shows, in order from left to right, longitudinal spherical aberration curves, astigmatic field curves and a distortion curve of the image capturing device according to the 10th embodiment.

In FIG. 10A, the image capturing device includes an imaging lens system (not otherwise herein labeled) of the present disclosure and an image sensor 1080. The imaging lens system includes, in order from an object side to an image side, a first lens element 1010, a second lens element 1020, a third lens element 1030, a fourth lens element 1040, and a fifth lens element 1050, wherein the imaging lens system has a total of five lens elements (1010-1050) with refractive power.

The first lens element 1010 with positive refractive power has an object-side surface 1011 being convex in a paraxial region thereof and an image-side surface 1012 being convex in a paraxial region thereof, which are both aspheric, and the first lens element 1010 is made of plastic material.

The second lens element 1020 with negative refractive power has an object-side surface 1021 being concave in a paraxial region thereof and an image-side surface 1022 being concave in a paraxial region thereof, which are both aspheric, and the second lens element 1020 is made of plastic material.

The third lens element 1030 with positive refractive power has an object-side surface 1031 being convex in a paraxial region thereof and an image-side surface 1032 being convex in a paraxial region thereof, which are both aspheric, and the third lens element 1030 is made of plastic material. Furthermore, each of the object-side surface 1031 and the image-side surface 1032 of the third lens element 1030 has at least one inflection point.

The fourth lens element 1040 with negative refractive power has an object-side surface 1041 being concave in a paraxial region thereof and an image-side surface 1042 being convex in a paraxial region thereof, which are both aspheric, and the fourth lens element 1040 is made of plastic material.

The fifth lens element 1050 with negative refractive power has an object-side surface 1051 being concave in a paraxial region thereof and an image-side surface 1052 being convex in a paraxial region thereof, which are both aspheric, and the fifth lens element 1050 is made of plastic material.

The imaging lens system is further provided with an aperture stop 1000 disposed between the first lens element 1010 and the second lens element 1020, and no lens element with refractive power is disposed between the aperture stop 1000 and the first lens element 1010. The imaging lens system further includes an IR-cut filter 1060 located between the fifth lens element 1050 and an image surface 1070. The IR-cut filter 1060 is made of glass and will not affect the focal length of the imaging lens system. The image sensor 1080 is disposed on or near the image surface 1070 of the imaging lens system.

The detailed optical data of the tenth embodiment are shown in TABLE 27, and the aspheric surface data are shown in TABLE 28, wherein the units of the curvature radius, the thickness and the focal length are expressed in mm, and HFOV is half of the maximal field of view.

TABLE 27

(Embodiment 10)
f = 6.36 mm, Fno = 2.82, HFOV = 24.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.637 | ASP | 0.890 | Plastic | 1.544 | 55.9 | 2.84 |
| 2 | | −21.736 | ASP | 0.014 | | | | |
| 3 | Ape. Stop | Plano | | 0.036 | | | | |
| 4 | Lens 2 | −31.605 | ASP | 0.300 | Plastic | 1.639 | 23.5 | −3.85 |
| 5 | | 2.676 | ASP | 0.528 | | | | |
| 6 | Lens 3 | 6.340 | ASP | 0.486 | Plastic | 1.639 | 23.5 | 9.34 |
| 7 | | −97.800 | ASP | 0.493 | | | | |
| 8 | Lens 4 | −4.862 | ASP | 0.350 | Plastic | 1.544 | 55.9 | −9.40 |
| 9 | | −100.000 | ASP | 1.223 | | | | |
| 10 | Lens 5 | −3.279 | ASP | 0.513 | Plastic | 1.535 | 55.7 | −9.41 |
| 11 | | −9.921 | ASP | 0.300 | | | | |
| 12 | IR-cut filter | Plano | | 0.210 | Glass | 1.517 | 64.2 | — |
| 13 | | Plano | | 0.497 | | | | |
| 14 | Image Surface | Plano | | — | | | | |

Note:
Reference wavelength is d-line 587.6 nm

TABLE 28

Aspheric Coefficients

| Surface # | 1 | 2 | 4 | 5 | 6 |
|---|---|---|---|---|---|
| k= | −4.5537E+00 | 1.0013E+01 | 6.9603E+01 | 5.1169E+00 | −2.4360E+01 |
| A4= | 1.3003E−01 | −1.1465E−01 | −1.8410E−01 | −1.3757E−01 | −6.2069E−02 |
| A6= | −7.4036E−02 | 3.9974E−01 | 6.2294E−01 | 3.5013E−01 | 6.0099E−02 |
| A8= | 8.2801E−02 | −7.9575E−01 | −1.1671E+00 | −6.0010E−01 | 1.1507E−01 |
| A10= | −8.3011E−02 | 9.6617E−01 | 1.4533E+00 | 8.7491E−01 | −8.4800E−02 |
| A12= | 4.8431E−02 | −6.1874E−01 | −9.8430E−01 | −7.2029E−01 | 1.0786E−02 |
| A14= | −1.2399E−02 | 1.5507E−01 | 2.6590E−01 | 2.1608E−01 | |

| Surface # | 7 | 8 | 9 | 10 | 11 |
|---|---|---|---|---|---|
| k= | 9.0000E+01 | 1.5389E+01 | −8.3513E+00 | 9.0509E−01 | 9.4081E+00 |
| A4= | −1.0310E−01 | −2.1835E−01 | −1.3284E−01 | −6.1503E−02 | −7.1742E−02 |
| A6= | 1.1527E−01 | 9.8591E−02 | 9.4205E−02 | 3.2047E−02 | 3.2444E−02 |
| A8= | −1.8153E−02 | 1.5329E−01 | 3.1151E−02 | −5.0339E−03 | −1.1851E−02 |
| A10= | 9.5627E−02 | −1.5890E−01 | −5.9510E−02 | −2.8861E−04 | 2.9732E−03 |
| A12= | −5.7180E−02 | 5.4126E−02 | 2.2742E−02 | 2.3711E−04 | −4.8532E−04 |
| A14= | | −9.3060E−03 | −2.9069E−03 | −2.1250E−05 | 3.6592E−05 |

In the 10th embodiment, the equation of the aspheric surface profiles of the aforementioned lens elements is the same as the equation of the 1st embodiment. Also, the definitions of these parameters shown in Table 29 below are the same as those stated in the 1st embodiment with corresponding values for the 10th embodiment, so an explanation in this regard will not be provided again.

Moreover, these parameters can be calculated from Table 27 and Table 28 and satisfy the conditions stated in Table 29.

TABLE 29

10th Embodiment

| f [mm] | 6.36 | f/R8 | −0.06 |
|---|---|---|---|
| Fno | 2.82 | R10/R8 | 0.10 |
| HFOV [deg.] | 24.5 | (R9 − R10)/(R9 + R10) | −0.50 |
| tan(2*HFOV) | 1.150 | f4/f5 | 1.00 |
| Nmax | 1.639 | SD/TD | 0.81 |
| (V2 + V3)/V1 | 0.84 | f/ImgH | 2.17 |
| CT3/T34 | 0.99 | EPD/ImgH | 0.77 |
| T34/ET34 | 7.26 | TL/f | 0.92 |
| (T23 + T45)/T34 | 3.55 | TL [mm] | 5.84 |
| f/R1 | 3.88 | | |

The foregoing description, for purpose of explanation, has been described with reference to specific embodiments. It is to be noted that TABLES 1-29 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising five lens elements, the five lens elements being, in order from an object side to an image side: a first lens element, a second lens element, a third lens element, a fourth lens element and a fifth lens element;
   wherein each of the five lens elements comprises an object-side surface facing toward the object side and an image-side surface facing toward the image side, and each of the third lens element, the fourth lens element, and the fifth lens element has at least one aspheric surface;
   wherein the object-side surface of the second lens element is concave in a paraxial region thereof and the third lens element has positive refractive power, the image-side surface of the fourth lens element is concave in a paraxial region thereof;
   wherein an Abbe number of the first lens element is V1, an Abbe number of the second lens element is V2, an Abbe number of the third lens element is V3, an axial distance between the object-side surface of the first lens element and an image surface is TL, a focal length of the imaging lens system is f, a maximum refractive index among the refractive indices of the first lens element, the second lens element, the third lens element, the fourth lens element and the fifth lens element is Nmax, and the following conditions are satisfied:

$0.5<(V2+V3)/V1<1.0;$ $0.75<TL/f<1.0;$ and $1.50<Nmax<1.70.$

2. The imaging lens system of claim 1, wherein the first lens element has positive refractive power, the object-side surface of the third lens element is convex in a paraxial region thereof, and the image-side surface of the third lens element is concave in a paraxial region thereof.

3. The imaging lens system of claim 1, wherein the image-side surface of the fifth lens element is convex in a paraxial region thereof, and an entrance pupil diameter of the imaging lens system is EPD, a maximum image height of the imaging lens system is ImgH, and the following condition is satisfied:

$0.7<EPD/ImgH<1.6.$

4. The imaging lens system of claim 1, wherein a central thickness of the third lens element is CT3, an axial distance between the third lens element and the fourth lens element is T34, and the following condition is satisfied:

$0.2<CT3/T34<2.2$.

5. The imaging lens system of claim 1, wherein a maximum image height of the imaging lens system is ImgH, and the following condition is satisfied:

$2.1<f/ImgH<6.0$.

6. The imaging lens system of claim 1, wherein a curvature radius of the object-side surface of the fifth lens element is R9, a curvature radius of the image-side surface of the fifth lens element is R10, and the following condition is satisfied:

$-1.0<(R9-R10)/(R9+R10)<0$.

7. The imaging lens system of claim 1, wherein an air gap is arranged on an optical axis between every two adjacent lens elements, a curvature radius of the object-side surface of the first lens element is R1, and the following conditions are satisfied:

$TL<7.5mm$; and $3.3<f/R1≤4.35$.

8. An imaging lens system comprising five lens elements, the five lens elements being, in order from an object side to an image side: a first lens element, a second lens element, a third lens element, a fourth lens element and a fifth lens element;
   wherein each of the five lens elements comprises an object-side surface facing toward the object side and an image-side surface facing toward the image side, and at least one of the five lens elements comprises at least one aspheric surface;
   wherein the image-side surface of the first lens element is concave in a paraxial region thereof, and the fourth lens element has negative refractive power, the image-side surface of the fifth lens element is convex in a paraxial region thereof, the first lens element, the second lens element, the third lens element, the fourth lens element and the fifth lens element are all made of plastic material;
   wherein an Abbe number of the first lens element is V1, an Abbe number of the second lens element is V2, an Abbe number of the third lens element is V3, an axial distance between the object-side surface of the first lens element and an image surface is TL, a focal length of the imaging lens system is f, a maximum refractive index among refractive indices of the first lens element, the second lens element, the third lens element, the fourth lens element and the fifth lens element is Nmax, and the following conditions are satisfied:

$0.5<(V2+V3)/V1<1.0$;

$0.75<TL/f<1.0$; and $1.50<Nmax<1.70$.

9. The imaging lens system of claim 8, wherein the first lens element has positive refractive power, the object-side surface of the first lens element is convex in a paraxial region thereof, and the image-side surface of the fourth lens element comprises at least one inflection point.

10. The imaging lens system of claim 8, wherein a curvature radius of the object-side surface of the fifth lens element is R9, a curvature radius of the image-side surface of the fifth lens element is R10, and the following condition is satisfied:

$-1.0<(R9-R10)/(R9+R10)<0$.

11. The imaging lens system of claim 9, wherein a half of maximal field of view of the imaging lens system is HFOV, and the following condition is satisfied:

$0.3<\tan(2*HFOV)<1.0$.

12. The imaging lens system of claim 8, wherein an air gap is arranged on an optical axis between every two adjacent lens elements, a curvature radius of the image-side surface of the fourth lens element is R8, and the following condition is satisfied:

$-1.8<f/R8<1.8$.

13. The imaging lens system of claim 8, wherein an entrance pupil diameter of the imaging lens system is EPD, a maximum image height of the imaging lens system is ImgH, and the following condition is satisfied:

$0.7<EPD/ImgH<1.6$.

14. The imaging lens system of claim 8, wherein the imaging lens system is further provided with an aperture stop, an axial distance between the aperture stop and the image-side surface of the fifth lens element is SD, an axial distance between the object-side surface of the first lens element and the image-side surface of the fifth lens element is TD, a curvature radius of the object-side surface of the first lens element is R1, and the following condition is satisfied:

$0.7<SD/TD<1.0$; and $3.3<f/R1≤4.35$.

15. The imaging lens system of claim 8, wherein an absolute value of a focal length of the third lens element is smaller than an absolute value of a focal length of the fifth lens element.

16. An image capturing device, comprising:
   the imaging lens system of claim 8; and
   an image sensor disposed on the image surface of the imaging lens system.

17. An electronic device, comprising:
   the image capturing device of claim 16.

18. An imaging lens system comprising five lens elements, the five lens elements being, in order from the object side to the image side: a first lens element, a second lens element, a third lens element, a fourth lens element and a fifth lens element;
   wherein the fourth lens element has negative refractive power, each of the five lens elements comprises an object-side surface facing toward the object side and an image-side surface facing toward the image side, and at least one of the five lens elements comprises at least one aspheric surface;
   wherein an axial distance between the fourth lens element and the fifth lens element is larger than an axial distance between the second lens element and the third lens element;
   wherein an Abbe number of the first lens element is V1, an Abbe number of the second lens element is V2, an Abbe number of the third lens element is V3, an axial distance between the object-side surface of the first lens element and an image surface is TL, a focal length of the imaging lens system is f, a maximum refractive index among refractive indices of the first lens element, the second lens element, the third lens element, the fourth lens element and the fifth lens element is Nmax, a curvature radius of the image-side surface of the fourth lens element is R8, and the following conditions are satisfied:

$0.5<(V2+V3)/V1<1.0;$ $0.75<TL/f<1.0;$ $1.50<Nmax<1.70;$ and $-1.8<f/R8<1.8.$

19. The imaging lens system of claim 18, wherein the image-side surface of the fourth lens element is concave in a paraxial region thereof.

20. The imaging lens system of claim 18, wherein the first lens element has positive refractive power, the second lens element has negative refractive power, and the third lens element has positive refractive power.

21. The imaging lens system of claim 18, wherein a curvature radius of the object-side surface of the fifth lens element is R9, a curvature radius of the image-side surface of the fifth lens element is R10, and the following condition is satisfied:

$-1.0<(R9-R10)/(R9+R10)<0.$

22. The imaging lens system of claim 18, wherein a maximum image height of the imaging lens system is ImgH, and the following condition is satisfied:

$2.1<f/ImgH<6.0.$

23. The imaging lens system of claim 18, wherein a half of maximal field of view of the imaging lens system is HFOV, and the following condition is satisfied:

$0.3<\tan(2*HFOV)<1.0.$

24. The imaging lens system of claim 18, wherein the imaging lens system is further provided with an aperture stop, an air gap is arranged on an optical axis between every two adjacent lens elements, an axial distance between the aperture stop and the image-side surface of the fifth lens element is SD, an axial distance between the object-side surface of the first lens element and the image-side surface of the fifth lens element is TD, and the following condition is satisfied:

$0.7<SD/TD<1.0.$

25. The imaging lens system of claim 18, wherein an entrance pupil diameter of the imaging lens system is EPD, a maximum image height of the imaging lens system is ImgH, a curvature radius of the object-side surface of the first lens element is R1, and the following condition is satisfied:

$0.7<EPD/ImgH<1.6;$ and $3.3<f/R1\leq4.35.$

26. The imaging lens system of claim 18, wherein at least one lens surface of the third lens element has an inflection point.

27. The imaging lens system of claim 18, wherein a central thickness of the second lens element is smaller than a central thickness of the third lens element.

* * * * *